US012360791B1

(12) United States Patent
Vadaparty et al.

(10) Patent No.: US 12,360,791 B1
(45) Date of Patent: Jul. 15, 2025

(54) GENERATING NEW SOFTWARE CODE FROM LEGACY SOFTWARE CODE USING LARGE LANGUAGE MODELS

(71) Applicant: Morgan Stanley Services Group Inc., New York, NY (US)

(72) Inventors: Kumar Vadaparty, Belle Mead, NJ (US); Kallol Duttagupta, Basking Ridge, NJ (US); Thomas Mathew, Parsippany, NJ (US); Kundan Sen, Plainview, NY (US); Shwetank Nagar, Alpharetta, GA (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 18/787,750

(22) Filed: Jul. 29, 2024

Related U.S. Application Data

(60) Provisional application No. 63/644,188, filed on May 8, 2024.

(51) Int. Cl.
| | |
|---|---|
| G06F 9/455 | (2018.01) |
| G06F 8/30 | (2018.01) |
| G06F 8/35 | (2018.01) |
| G06F 8/41 | (2018.01) |

(52) U.S. Cl.
CPC ............ *G06F 9/45516* (2013.01); *G06F 8/31* (2013.01); *G06F 8/35* (2013.01); *G06F 8/447* (2013.01)

(58) Field of Classification Search
None
See application file for complete search history.

(56) References Cited

U.S. PATENT DOCUMENTS

| | | | |
|---|---|---|---|
| 10,630,811 B1 | 4/2020 | Vadaparty et al. | |
| 10,769,714 B1 | 9/2020 | Vadaparty et al. | |
| 10,867,343 B1 | 12/2020 | Vadaparty et al. | |

(Continued)

FOREIGN PATENT DOCUMENTS

EP          4027239 A1 *  7/2022  ............ G06F 11/302

OTHER PUBLICATIONS

Duc et al., "Generative Artificial Intelligence for Software Engineering—A Research Agenda," arXiv, 2023. (Year: 2023).*
Fan et al., "Large Language Models for Software Engineering: Survey and Open Problems," arXiv, 2023. (Year: 2023).*
Patil et al., "A Review of Current Trends, Techniques, and Challenges in Large Language Models (LLMs)," PrePrints.org, 2024. (Year: 2024).*

(Continued)

*Primary Examiner* — Ryan D. Coyer
(74) *Attorney, Agent, or Firm* — K&L Gates LLP

(57) ABSTRACT

Computer-implemented systems and methods use a Large Language Model (LLM) for converting a legacy computer program in a first language to a human-language description of the legacy computer program, which description can be validated as being an accurate description of the legacy computer program. Once validated, the human-language description can be converted, again using an LLM, to a computer program in a target programming language. An LLM can also be used to generate test scripts for the new target-language program to test the performance of the target-language program in a production environment. An LLM can also be used to reconcile outputs from the legacy program to the new target program, such as on a function-by-function basis. If the differences between the outputs (if any) are sufficiently negligible, the legacy computer program can be decommissioned, and the new, target language program can be used in production.

28 Claims, 16 Drawing Sheets

(56) References Cited

U.S. PATENT DOCUMENTS

| | | |
|---|---|---|
| 10,867,351 B1 | 12/2020 | Vadaparty et al. |
| 11,341,575 B1 | 5/2022 | Vadaparty et al. |
| 11,348,159 B1 | 5/2022 | Vadaparty et al. |
| 11,392,486 B1 | 7/2022 | Vadaparty et al. |
| 11,443,375 B1 | 9/2022 | Vadaparty et al. |
| 11,726,750 B1 | 8/2023 | Arcadinho et al. |
| 11,797,317 B1 * | 10/2023 | McLaughlin ............. G06F 8/43 |
| 2023/0252224 A1 | 8/2023 | Tran |
| 2023/0342116 A1 | 10/2023 | Dibia et al. |
| 2024/0020097 A1 | 1/2024 | Czapiewski |
| 2024/0028312 A1 | 1/2024 | Gillman et al. |
| 2024/0111498 A1 | 4/2024 | Vaughn |
| 2025/0045185 A1 * | 2/2025 | Tang ................... G06F 11/3684 |
| 2025/0094145 A1 * | 3/2025 | Weber ....................... G06F 8/43 |

OTHER PUBLICATIONS

Wong et al,. "Natural Language Generation and Understanding of Big Code for AI-Assisted Programming: A Review," Entropy, 2023. (Year: 2023).*

Sahil Bhatia et al., Verified Code Transpilation with LLMs, Jun. 2024, 19 pages.

Hasan Ferit Eniser et al., Towards Translating Real-World Code with LLMs: A Study of Translating to Rust, May 2024, 11 pages.

Rangeet Pan et al., Lost in Translation: A Study of Bugs Introduced by Large Language Models while Translating Code, Jan. 2024, 13 pages.

IBM News, COBOL programmers are getting harder to find. IBM's code-writing AI can help, Oct. 2023, 7 pages.

* cited by examiner

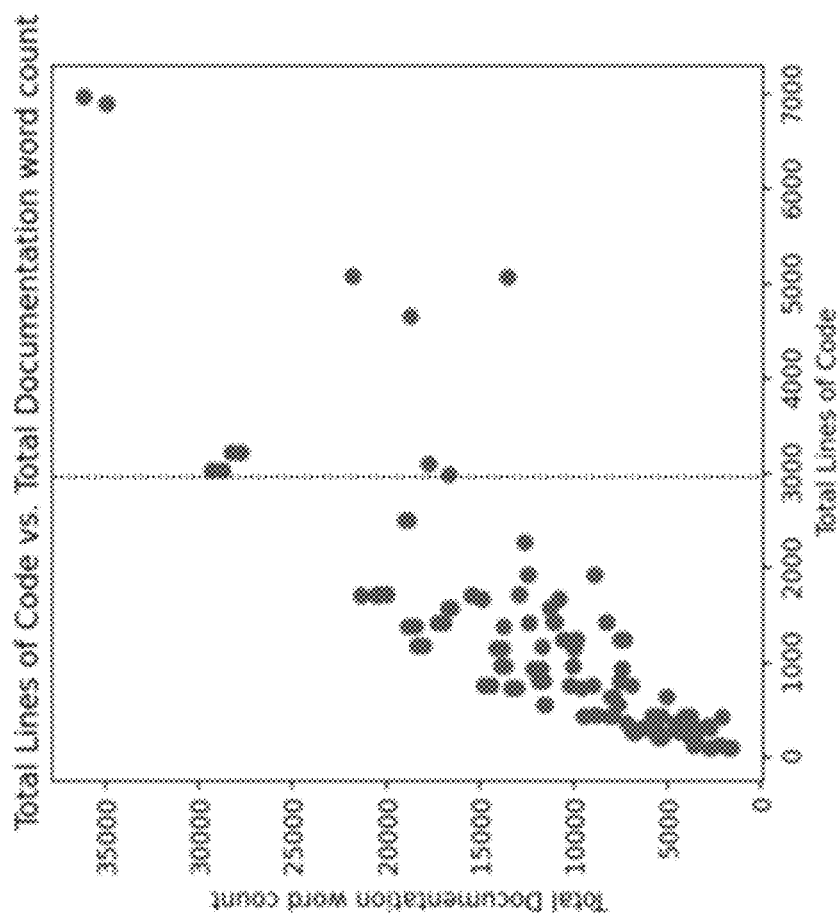
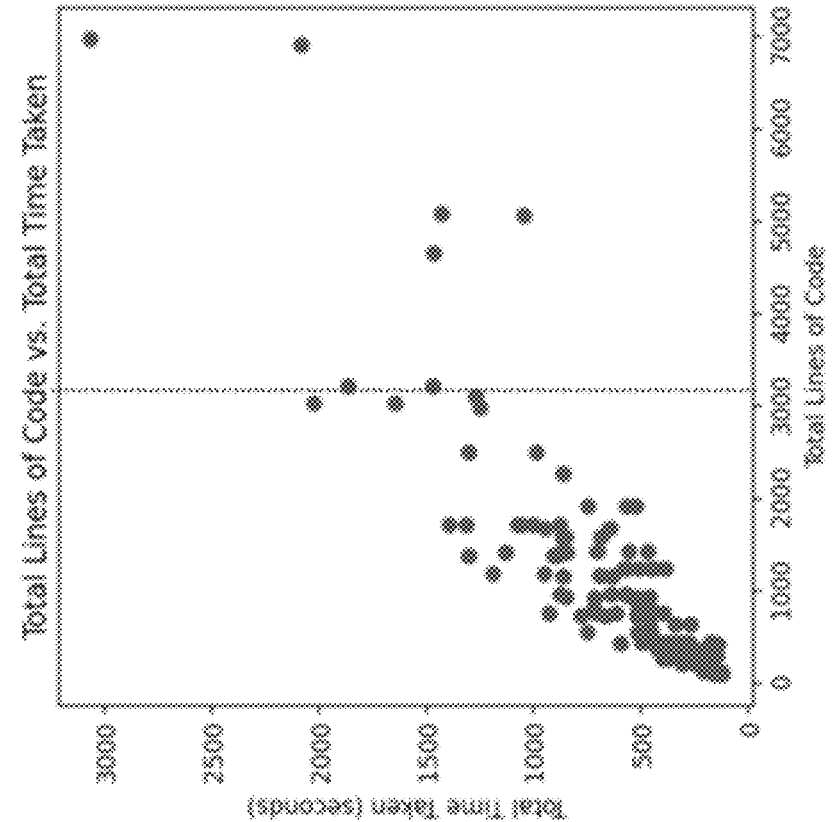
Figure 9B
Figure 9A

Fig. 11

Rules Data Model

| Entity | Field Name | Type | Field Type | DataService (empty if no data service) | Valid Values/Unit/DomainT | Description |
|---|---|---|---|---|---|---|
| account | account | string | | | | |
| account | acct-class | string | | AccountDS | | |
| position | | list-of-string | | | | |
| position | | Boolean | | | | |
| security | | map | | | | |
| security | | | | | | |
| transaction | | | | | | |
| transaction | | | | | | |

Fig. 12

| Rule No. | Rule ID | Product | | | | | Rule Name | Precise Rule Expression | Rule Description |
|---|---|---|---|---|---|---|---|---|---|
| | | A | B | C | D | | | | |
| 1 | | Y | Y | Y | | | | | |
| 2 | | Y | Y | Y | | | | | |
| 3 | | Y | Y | Y | Y | | | | |
| 4 | | | Y | Y | Y | | | | |
| 5 | | | | Y | Y | | | | |

| | A | B | C | D |
|---|---|---|---|---|
| 1 | Rule ID | Rule Name | Outcome | Rule Message |
| 2 | | | Failure | |
| 3 | | | Warning | |
| 4 | | | Manager approval | |
| 5 | | | | |
| 6 | | | | |
| 7 | | | | |

Fig. 13

Test Script ID: TestScript1

| Activity Group | Activity ID | Activity Name | Function | Application (Model) | SET/GET | Comments |
|---|---|---|---|---|---|---|
| 1 | ID1 | Activity1 | Function1 | App1 | SET (A) | |
| 2 | ID2 | Activity2 | Function2 | App1 | SET (B) | |
| 3 | ID3 | Activity3 | Function3 | App1 | USE ("P", A, B) | |
| 4 | ID4 | Activity4 | Function4 | App1 | | |

Test Script ID: TestScript2

| Activity Group | Activity ID | Activity Name | Function | Application (Model) | SET/GET | Comments |
|---|---|---|---|---|---|---|
| 1 | ID1 | Activity1 | Function1 | App1 | SET (C) | |
| 2 | ID2 | Activity2 | Function2 | App1 | SET (D) | |
| 3 | ID3 | Activity3 | Function3 | App1 | USE ("P", C, D) | |
| 4 | ID4 | Activity4 | Function4 | App1 | | |

FIG. 15

| Application | Activities | Attribute Type | Attribute Value Type | Attribute Value |
|---|---|---|---|---|
| App1 | Activity1, Activity 2, Activity 3 | AttType1 | Scaler | AttributeValue1 |
| App1 | Activity1, Activity 2, Activity 3 | AttType1 | Scaler | AttributeValue2 |
| App1 | Activity5 | AttType2 | KeyValuePair | AttributeValue3 |

FIG. 16

GENERATING NEW SOFTWARE CODE FROM LEGACY SOFTWARE CODE USING LARGE LANGUAGE MODELS

PRIORITY CLAIM

The present application claims priority to U.S. provisional application Ser. No. 63/644,188, filed May 8, 2024, titled "Generating New Software Code from Legacy Software Coding using Large Language Models," which is incorporated herein by reference.

BACKGROUND

An order management system is a computer system that executes trade orders for financial securities. Brokers and dealers use order management systems when filling orders for various types of securities, such as orders to buy or sell stocks, bonds, or other financial securities, and to track the progress of each trade order through its various states of progression, such as pre-approval (if needed), opened, filled, canceled, confirmed, etc. Order management systems are often (although not always) implemented with so-called "middle tier" computer systems that orchestrate various activities (such as business logic execution and data retrieval services) and that execute the state transitions. The middle tier often relies on business rules in orchestrating the activities and executing the state transitions, which business rules can vary based on, for example, the product (e.g., type of financial security) and the computer platforms that handle the trade orders for the various products. As such, the execution of business rules is typically performed in various code modules that are spread across multiple programs.

The COBOL programming language has been commonly used, since the 1960s, for mainframe-implemented finance systems, such as systems for large-scale batch and transaction processing jobs, such as order management systems. COBOL is a compiled English-like computer programming language; it is an imperative, procedural and, since 2002, object-oriented language. Integrating COBOL with new technologies like open banking, blockchain or AI is near impossible. This stifles creativity and makes it difficult for financial institutions to implement modem features to meet rapidly changing customer demands. Also, modern programming languages offer robust anti-fraud and security features that COBOL simply cannot match.

Sybase is another computer technology that is not as popular as it once was. For decades, Sybase was a popular relational enterprise database management system and programmers learned and wrote code for Sybase systems. Interest in Sybase has reduced recently due to other database technologies, such as cloud storage and multi-model databases. Many companies continue to have and use large amounts of code for Sybase databases.

Perl is another language popular in legacy systems that are integral to business operations, but Perl's usage has declined and finding skilled developers to maintain and update legacy systems that use Perl has become increasingly challenging.

SUMMARY

In one general aspect, embodiments of the present invention are directed to computer-implemented systems and methods for using a Large Language Model (LLM) to convert a legacy computer program in a first language, such as COBOL Sybase, or Perl, used by an enterprise, such a financial services firm, to code written in another, "target" programming language, such as Java or Python. In one embodiment, the LLM first converts that legacy program to a human-language (e.g., English) description of the legacy computer program. Then that human-language description can be validated as being an accurate description of the legacy computer program by a subject matter expert (e.g., a program owner for the legacy computer program). Once validated, the human-language description can be converted, again using an LLM, to a computer program in a target programming language, such as Python or Java. Sometimes, the validated description can be broken down into multiple functional descriptions, and each component can then be targeted to the new programming language such as Python or Java, using the LLM. In other words, "modernization" of complex code in this manner is not always a "lift and shift" operation.

Then, an LLM can also be used to generate test scripts for the new target-language program to test the performance of the target-language program in a production environment. Also, an LLM can be used to reconcile outputs from the legacy program to the new target program. Such reconciliation can be used to verify that the target language program produces the same outputs as the legacy program, preferably on a function-by-function basis. If the differences between the outputs (if any) are sufficiently negligible, the legacy computer program can be decommissioned, and the enterprise computer system can use the new, target language program in production.

In another set of embodiments, the target language code is generated by the LLM, based on prompting, directly from the legacy code without having to generate and validate the intervening human language (e.g., English) description of the legacy program. In such embodiments, the prompting comprises a first prompt that comprises, among other things, (i) a directive to generate the program code in the target programming language directly from the legacy software program; and (ii) a number of iterative steps that the LLM is to observe in generating the target language program code. The iterative steps include for the LLM to (a) expand one function at a time, keeping N lines or less (e.g., 100 lines or less) in a function body being expanded and pushing any detail logic for function being expanded to one or more sub-functions; (b) tag each of the one or more sub-functions to be expanded with a tag word; and (c) provide a next prompt that should be provided to the LLM to continue iterative migration of the legacy software program to the program code in the target programming language. The user can then, iteratively, provide to the LLM the prompts corresponding to the next prompt provided by the LLM. The prompting can further include: a first additional prompt to the LLM to review the program code in the target programming language and provide one or more adjustments to the program code in the target programming language; a second additional prompt to implement the one or more adjustments; and a third additional prompt to write unit tests for the program code in the target programming language. This embodiment is particularly beneficial for translating short, dense legacy programs, such as programs written in Perl, to a more modern programming language like Python, such that the Python program remains faithful to the intricacies of the legacy program.

The procedures described herein can accelerate the time and reduce the cost of converting programs written in outdated programming languages to corresponding programs in modern programming languages, while maintaining the governance for the program. These and other benefits that can be realized through embodiments of the present invention will be apparent from the description that follows.

FIGURES AND APPENDICES

Various embodiments of the present invention are described herein by way of example in connection with the following figures and appendices.

Figure 3:
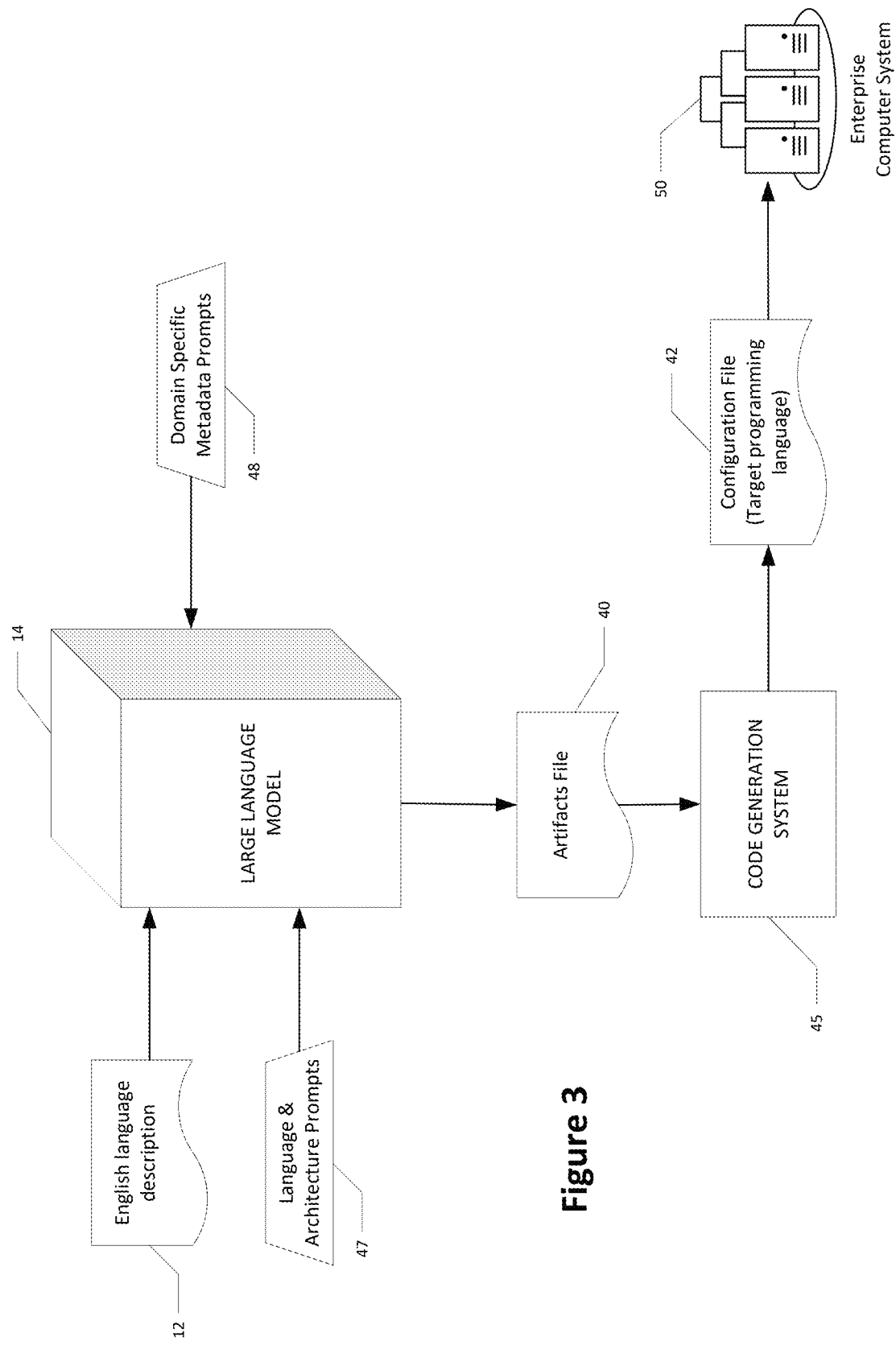
Figure 4:
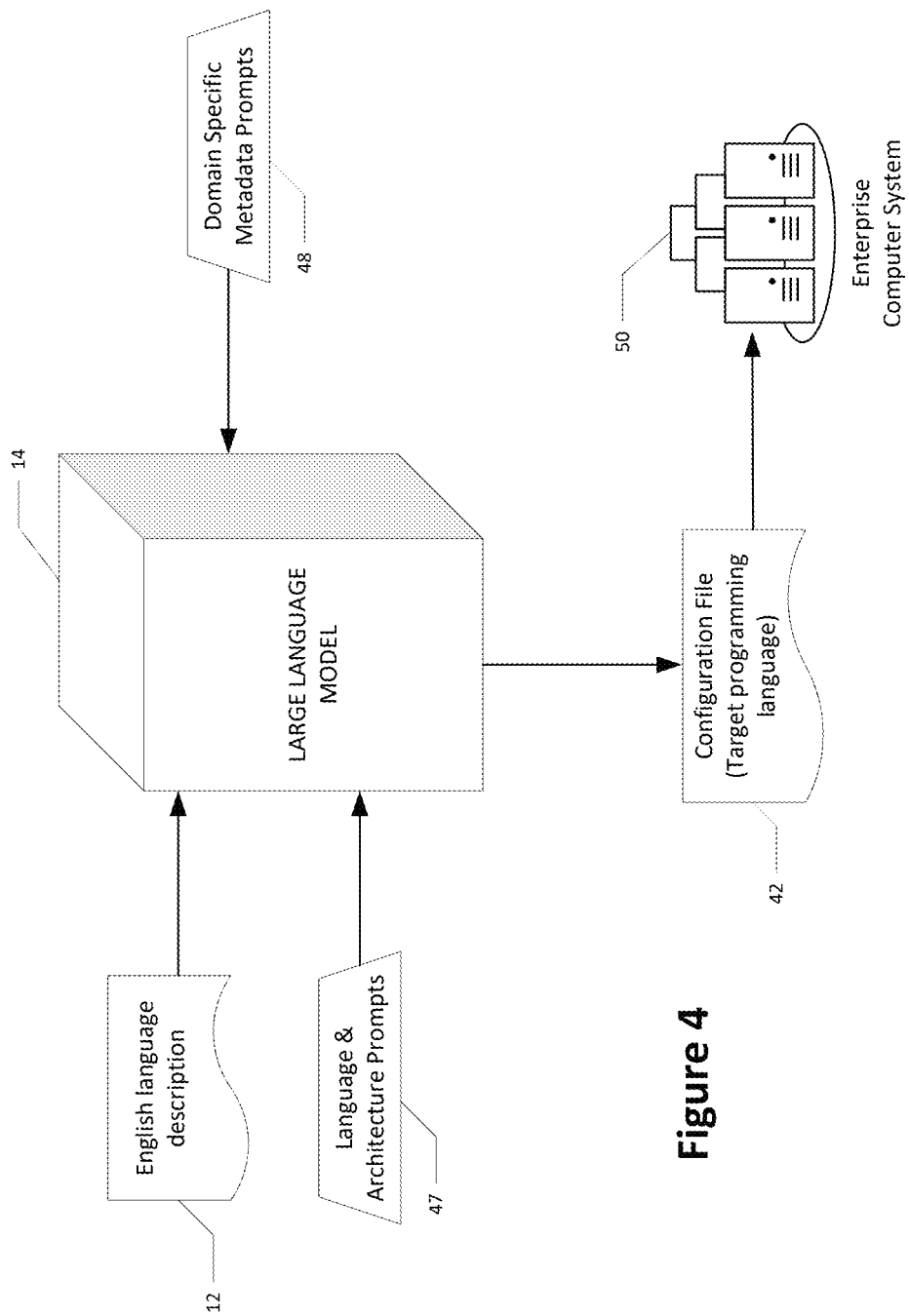
Figure 5:
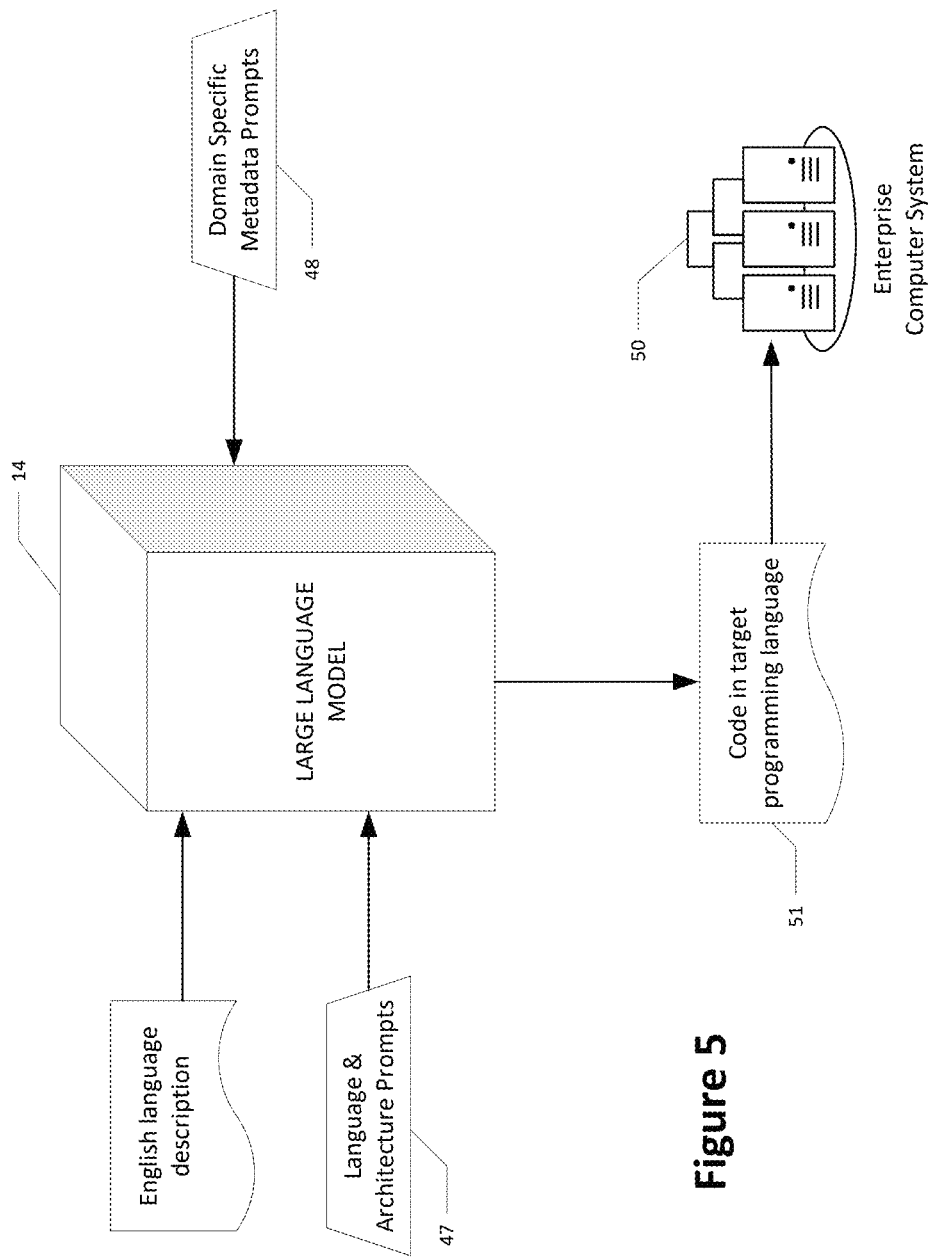

FIGS. 3, 4, and 5 show different embodiments of the LLM producing code, or code artifacts, in the target programming language.

Figure 6:
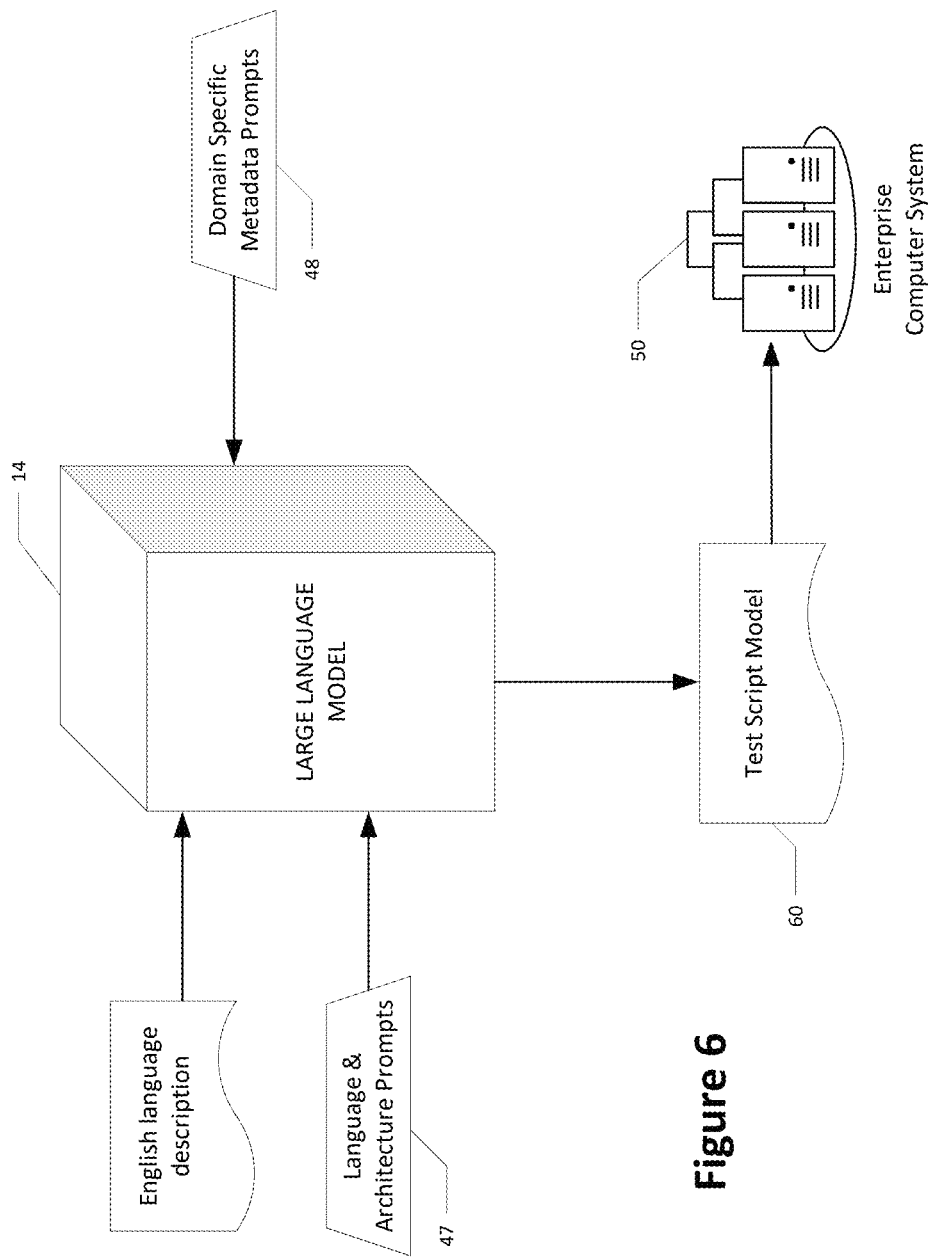

FIG. 6 illustrates the LLM producing test scripts for the target language program according to various embodiments of the present invention.

Figure 7:
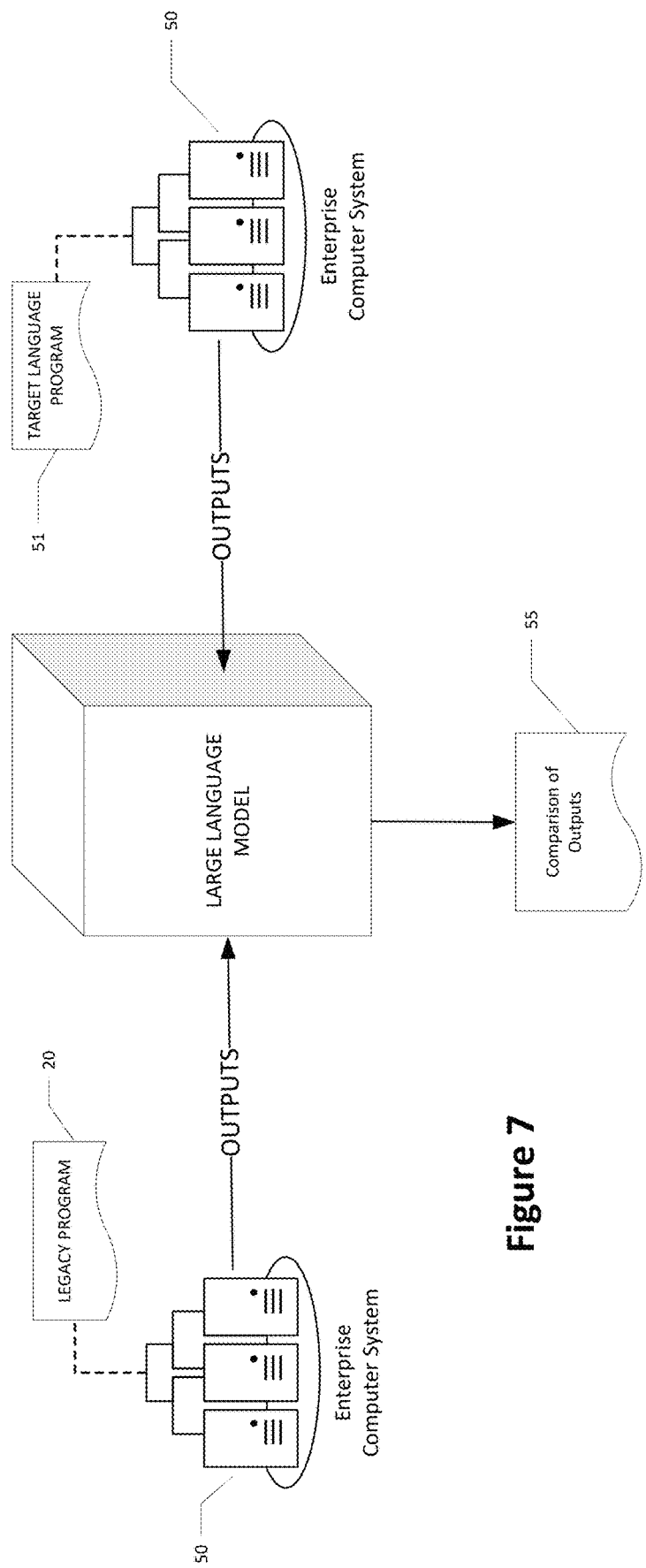

FIG. 7 illustrate the LLM comparing outputs from the legacy program and from the target language program.

Figure 8:
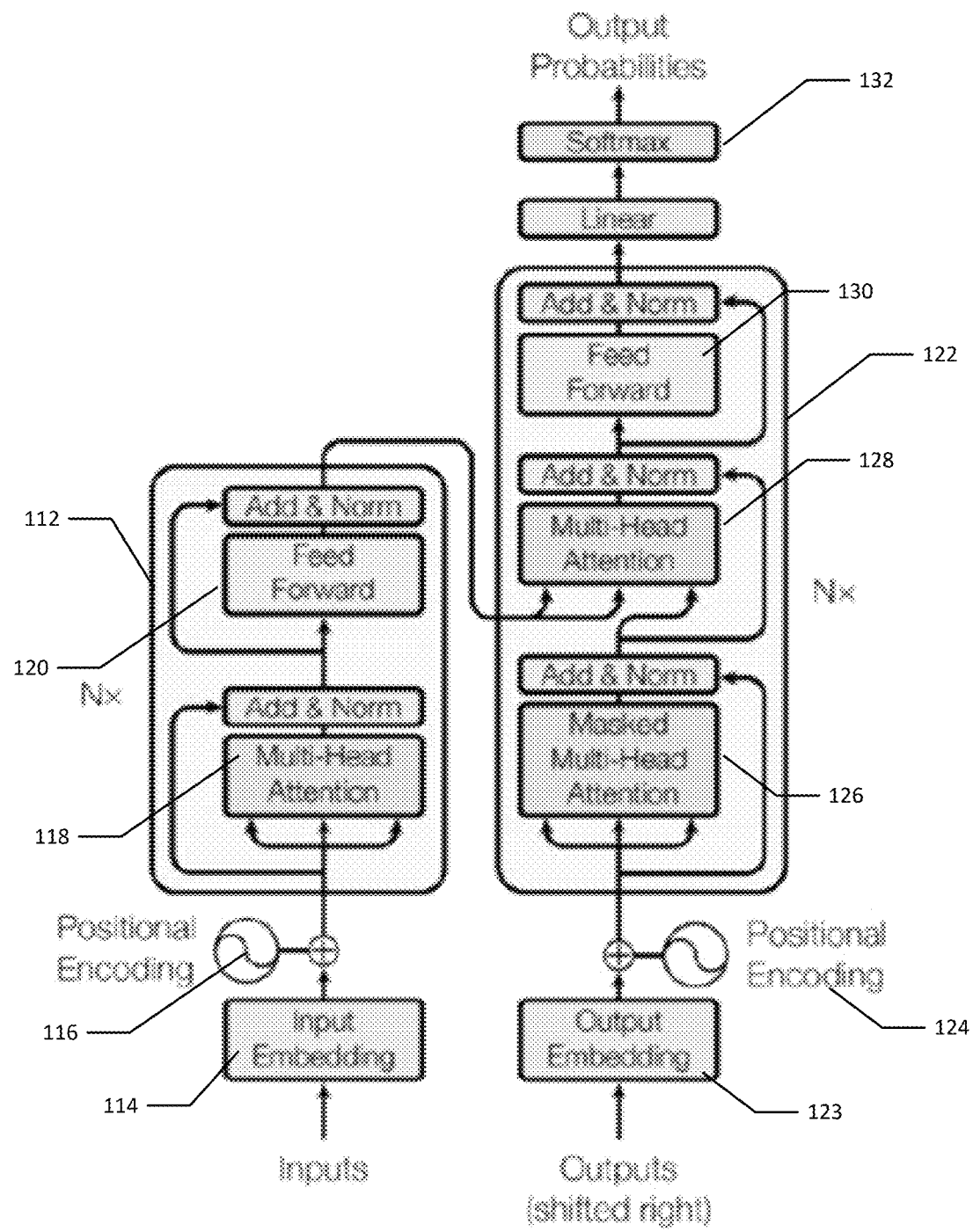

FIG. 8 is a diagram of a transformer that could be used by the LLM according to various embodiments of the present invention.

FIG. 9A is a plot showing the time taken by the LLM to generate the English language description as a function of the total lines of code in the legacy program and FIG. 9B is a plot showing the number of words in the natural language description generate the English language description of the legacy program as a function of the total lines of code in the legacy program.

Figure 10:
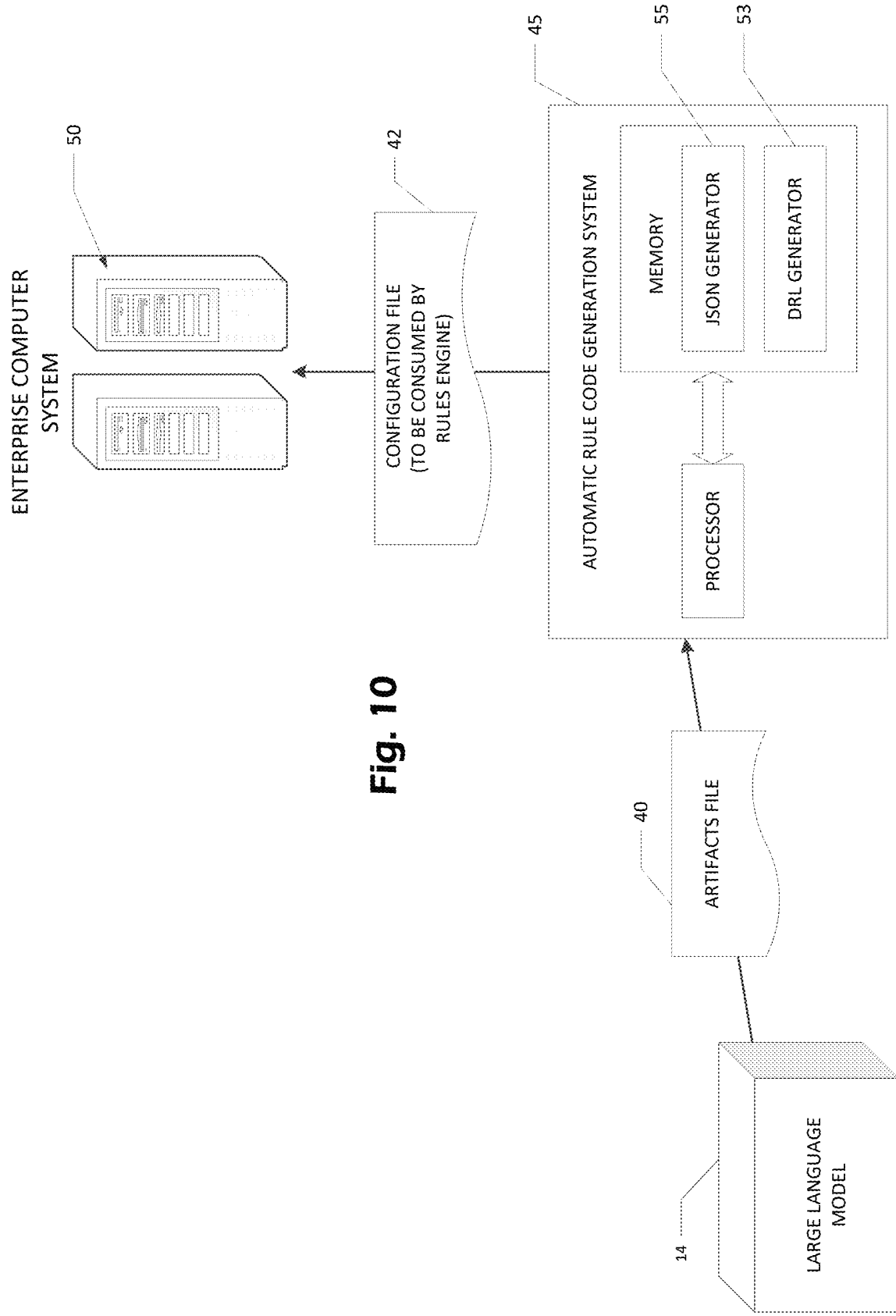

FIG. 10 is diagram of a system for generating the configuration file of FIG. 3 from the artifacts file of FIG. 3 according to various embodiments of the present invention.

FIG. 11 shows a sample rules data model sheet of the LLM-generated artifacts file according to various embodiments of the present invention.

FIG. 12 shows a sample rules sheet of the LLM-generated artifacts file according to various embodiments of the present invention.

FIG. 13 shows a sample rule outcomes sheet of the LLM-generated artifacts file according to various embodiments of the present invention.

Figure 14:
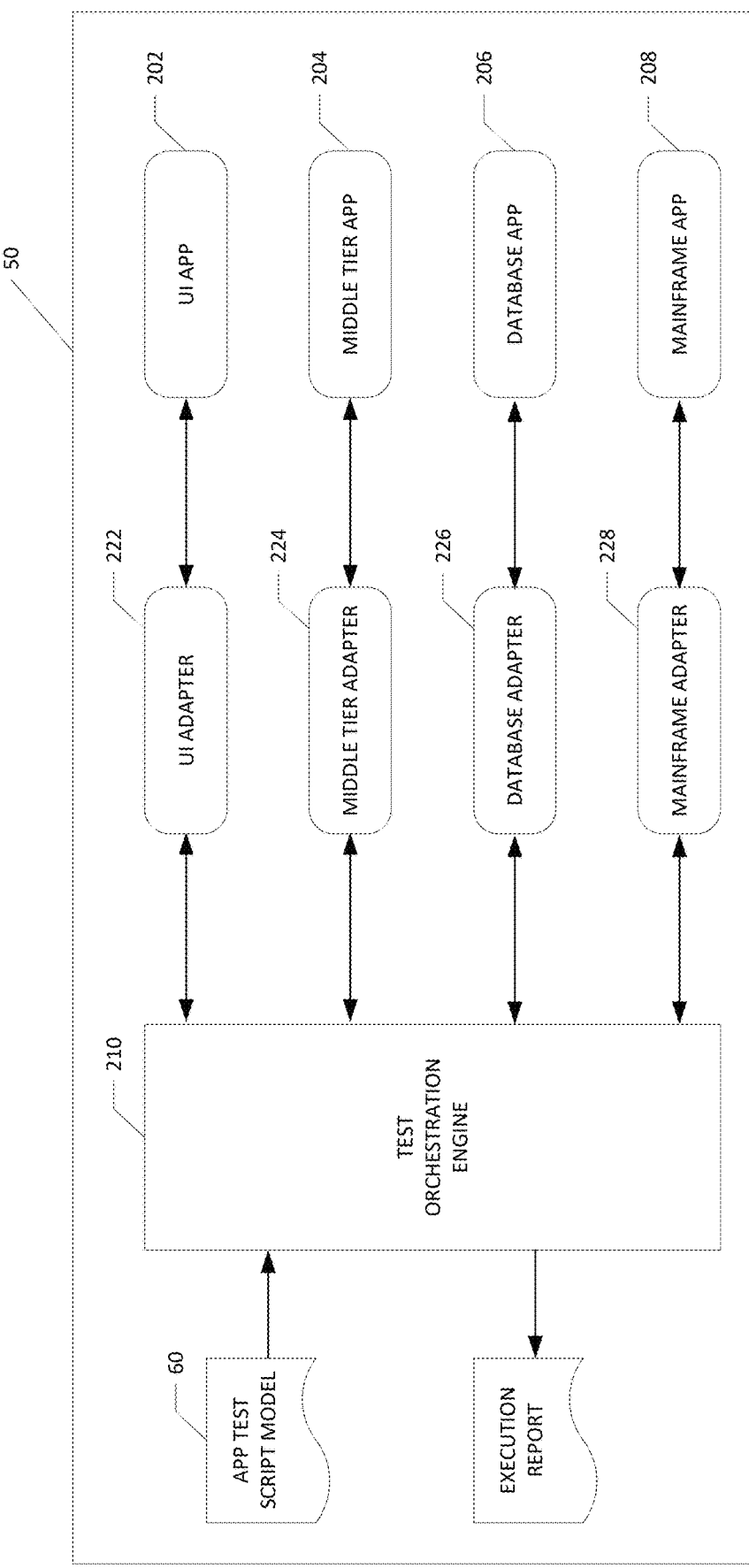

FIG. 14 is a block diagram depicting, according to various embodiments of the present invention, a test orchestration engine of the enterprise computer system.

FIG. 15 depicts an example test script model of the app test script model of FIG. 14 according to various embodiments of the present invention.

FIG. 16 depicts an example script model of the app test script model of FIG. 14 according to various embodiments of the present invention.

Figure 17:
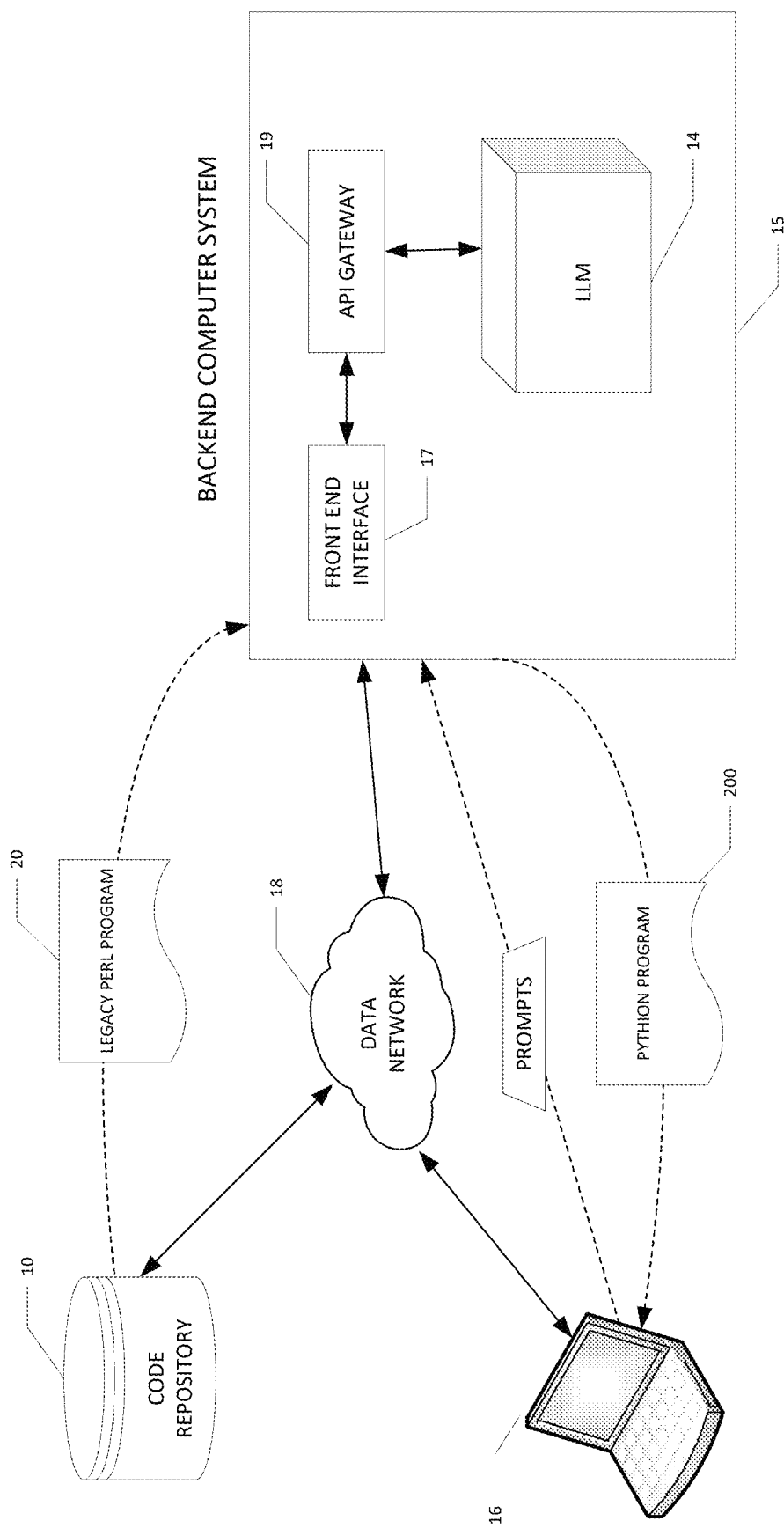

FIG. 17 is a diagram of a system according to various embodiments of the present invention that include a LLM for generating, from a legacy software program, a new, corresponding program in a different programming language.

Figure 18:
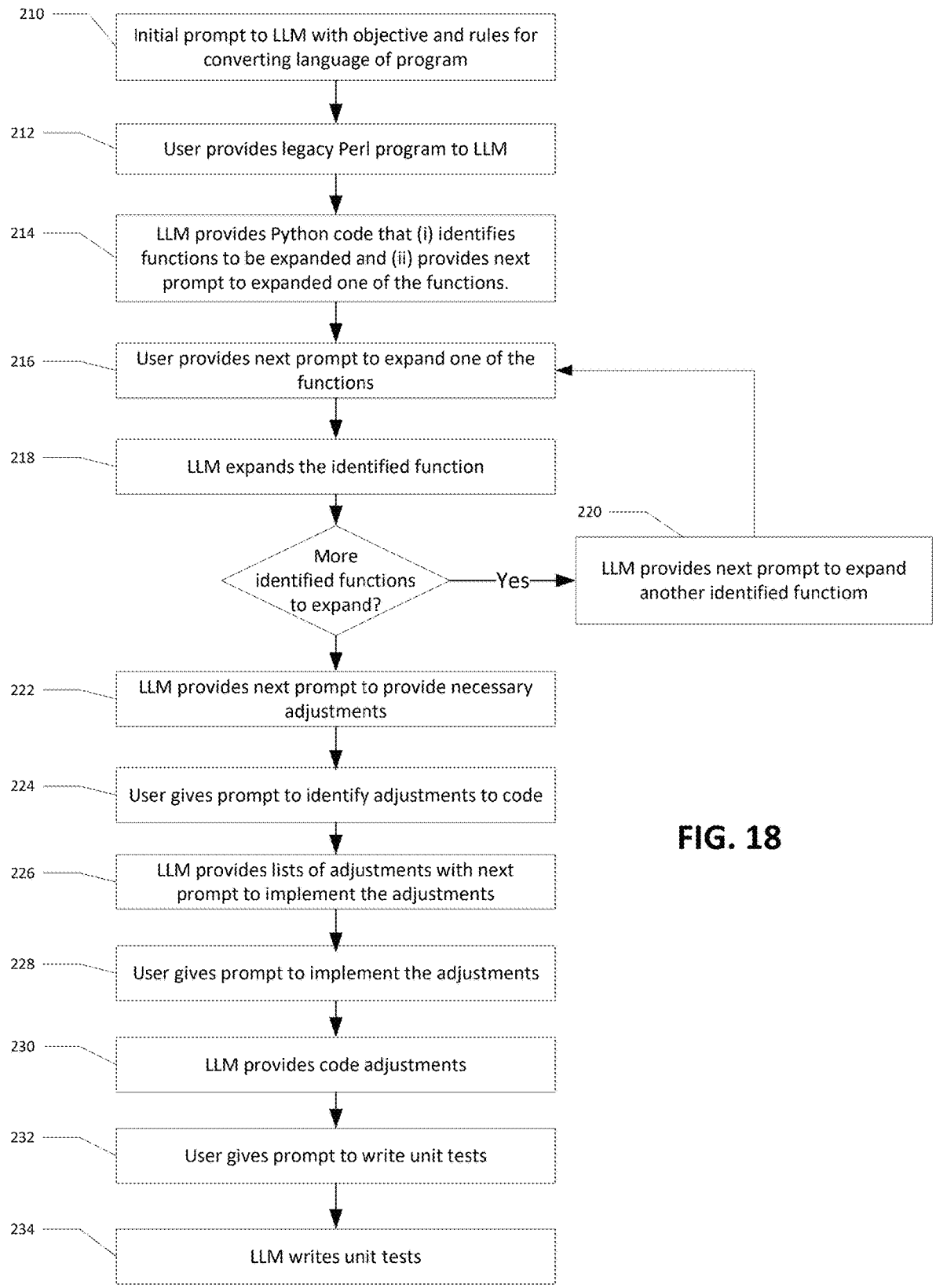

FIG. 18 is a flowchart of the process for generating, using the LLM of the system of FIG. 17, from a legacy software program, the new, corresponding program in the different programming language.

Appendix A is an example COBOL program.

Appendix B is an example description of the COBOL program of Appendix A produced according to an embodiment of the present invention.

DESCRIPTION

Figure 1:
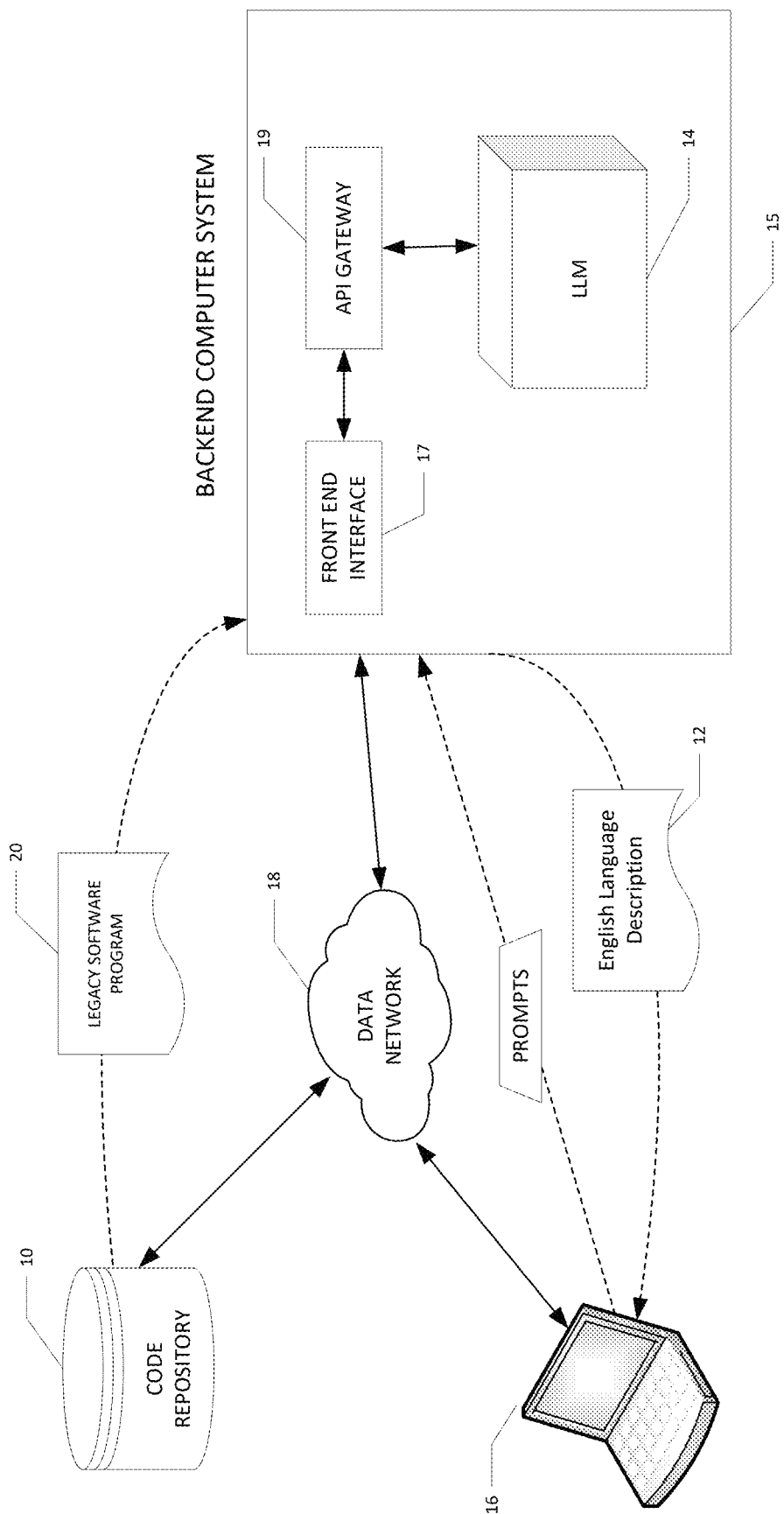
FIG. 1 is diagram of a system according to embodiments of the present invention that include a LLM generating a human language description of the legacy computer program.

FIG. 1 illustrates a system for converting a legacy computer program, stored in a code repository 10, for example, into a description 12 in a human language (English is assumed to be the human language for the remainder of this description) using a LLM 14. The legacy program could have been used in computer systems of an enterprise, particularly systems of a financial services firm, such as order management systems for equities or fixed income instruments, for example, or other enterprise computer systems, such as system for moving funds between accounts of a customer, etc.

The legacy program may be written in a programming language such as COBOL or Sybase, for example, or some other programming language. The English language description 12 can then be validated for accuracy by a SME of the enterprise. Once validated, the English language description can input to the LLM 14 (or another LLM) to generate artifacts, for a particular enterprise framework, that capture the business rules, entity model and orchestration steps, etc. of the legacy program. A configuration file, in a different programming language, such as Java, can then be generated from the artifacts, where the configuration file includes rule code to be executed by a computer system of the enterprise, such as the order management system. The LLM 14 can also be used generate test scripts for the computer system of the enterprise, such as the order management system. Still further, the LLM 14 can be used to compare, function-by-function, outputs of the enterprise's computer system using both the legacy program and the new program (in the different language) to identify and remedy any discrepancies.

FIG. 1 illustrates a user at a user computer device 16 communicating with a backend computer system 15 4 via an electronic data network 18, such as the Internet, where the backend computer system 15 comprises the LLM 14. The LLM 14 is a generative AI system that is trained, through machine learning, to generate an output, such as the English-language description 12, based on inputs to the LLM 14, with the inputs including the legacy program 20 and prompts (or "directives") from the end user 16. The LLM 14 could be, for example, one of OpenAI's GPT series of models (e.g., GPT-3.5 and GPT-4 used in ChatGPT), BERT (Bidirectional Encoder Representations from Transformers), RoBERTa (A Robustly Optimized BERT Pretraining Approach), PaLM (Pathways Language Model) and Gemini (Gemini AI), or some other suitable LLM. FIG. 8, described further below, provides more details about an LLM.

The user computer device 16 can communicate with the LLM 14 via a front-end interface 17 that interacts with the LLM 14 via an API gateway 19, for example. The end user, at the user computer device 16, can interact with the LLM 14 through a user interface, which can be a web application, a mobile app, a chat widget embedded in a website, or a desktop application, for example. This UI can provide a text input field where users can type their queries or prompts, which are described below, and the UI can also have a display area where the responses from the LLM are shown or from where the output (such as the description 12, described further below) can be downloaded to the user computer device 16. The front-end interface 17 can be implemented with a web server that hosts the user interface and handles the initial HTTP requests from the user's device 16. The API gateway 19 can route the user's inputs/prompts to the LLM 14 and, once the LLM 14 generates a response, route the response to the front end interface 17 for sending on to the user device 16. API gateway 19 can serve as a single entry point for all client requests, simplifying the interaction between the clients and the LLM 14. The API gateway 19 can be implemented with a software layer that can be deployed server of the backend computer system 15. To the end, the backend computer system 15 can be implemented multiple servers, such as in a cloud computing environment.

Figure 2:
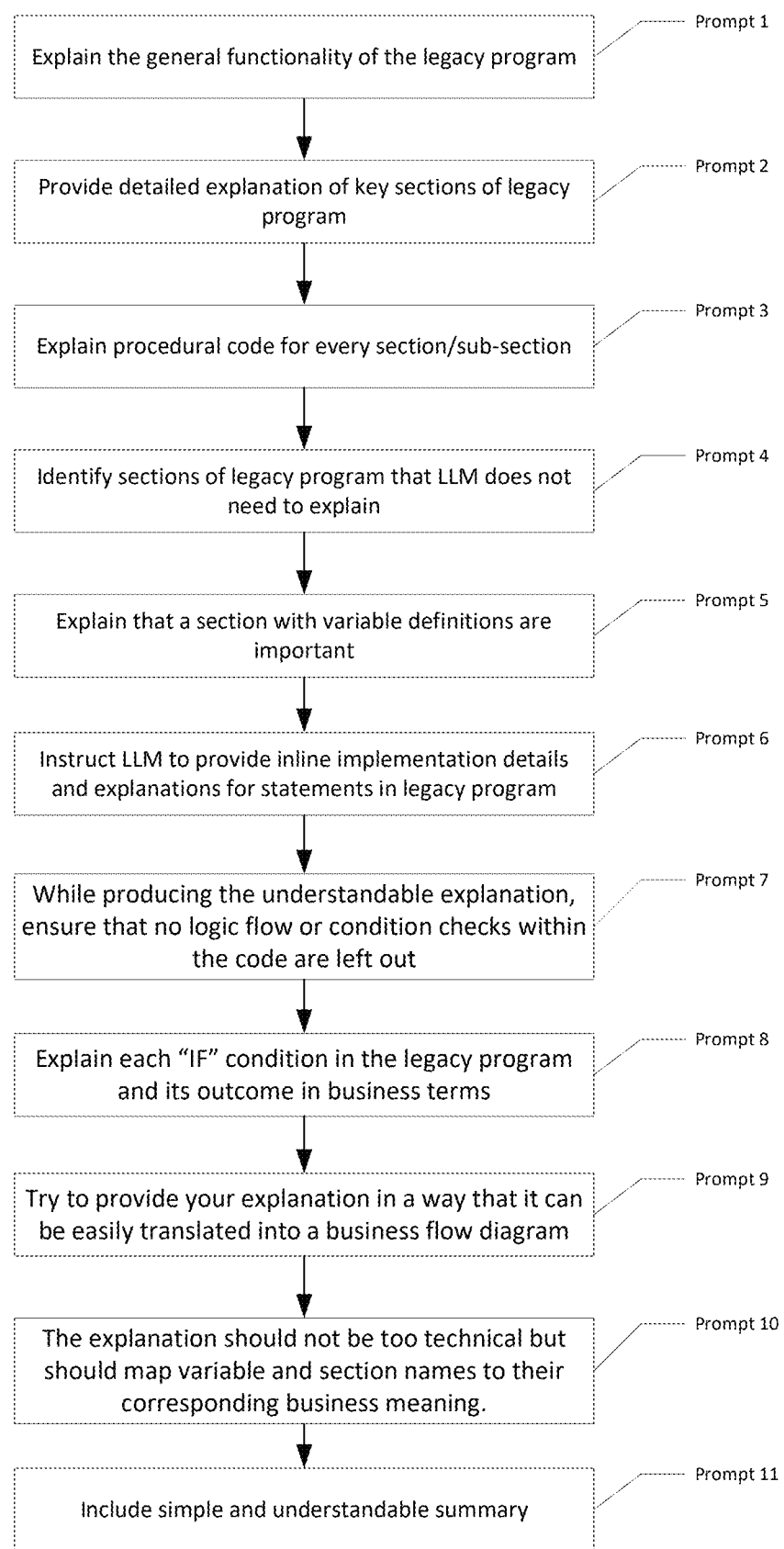
FIG. 2 shows prompts that can be used to cause the LLM to generate an accurate human language description consistently of the legacy computer program.

Preferably, the end-user 16 provides, to the LLM 14, the legacy program 20 in a text file, for example, along with appropriate prompts/directives, so that the LLM 14 generates the description 12 that is usable by the enterprise to generate the program in the target language. An example of the prompts is described in connection with the example COBOL program, called "AMBGPTAI," at Appendix A hereto, along with the flowchart of FIG. 2. In the example of FIG. 2, the prompts do not include any domain specific information for the legacy program, e.g., the business unit where the legacy program is used or the function of the legacy program. And the general prompts of FIG. 2 can be provided against any snippet of COBOL code and can be adapted for other programming languages too.

For the first prompt, the end user 16 provides the overall task for the LLM with respect to the legacy program: to provide an explanation of the general functionality of the legacy program. This prompt can further include a target audience for the description 12 that the LLM 16 is to generate, such as a business analyst who wants to understand what the code is doing.

For the second prompt, the end user 16 prompts the LLM 14 to provide a detailed explanation of the key sections of the legacy program 20, including how the key sections interact with each other and their implications in the full context of the legacy program.

For the third prompt, the end user 16 prompts the LLM to provide in full detail the procedural code for every section and sub-section of the legacy program.

For the fourth prompt, the end user 16 can identify sections of the legacy program that the LLM can ignore in its analysis. For the AMBGPTAI program at Appendix A, for example, the end user's fourth prompt can be that the LLM 16 need not explain sections of the program named IDENTIFICATION DIVISION and ENVIRONMENT DIVISION, as these sections do not add much to the business logic.

At the fifth prompt, the end user 16 can identify a section(s) of the legacy program that is important, such as because the section hold variables that have been initialized with a value which might be used later in the code, because the section might hold global variables, and/or because the section includes a copybook format definition. For the AMBGPTAI program example, the end user can identify the WORKING-STORAGE SECTION as important at this prompt.

At the sixth prompt, the end user prompts the LLM to provide inline implementation details for the statements in the code along with explanations of those statements. For the AMBGPTAI program example, the end user can prompt the LLM that when it encounters statements like, with respect to the AMBGPTAI program example, PERFORM 3000-VALIDATE-RECORD-RTN "do not just say the steps in '3000-VALIDATE-RECORD-RTN' will be performed. Instead, include all the implementation details of '3000-VALIDATE-RECORD-RTN' inline along with the explanation."

At the seventh prompt, the end user can prompt the LLM to, while producing the understandable explanation, ensure that no logic flow or condition checks within the code are left out.

At the eighth prompt, the end user can provide more instructions for how the LLM is to generate the description, such as to explain each "IF" condition in the legacy program and its outcome in business terms.

At the ninth prompt, the end user can provide more general guidance for the LLM as to the level of the desired description, particularly that the description can be easily translated into a business flow diagram. For the example, the ninth prompt could be something like: "Try to provide your explanation in a way that it can be easily translated into a business flow diagram."

At the tenth prompt, the end user provides guidance for the LLM about the level of detail in the description, such as: "The explanation should not be too technical but should map variable and section names to their corresponding business meaning."

The eleventh prompt can prompt the LLM to also include a summary in the description, where the summary gives a complete picture of the code's function in a simple and understandable manner.

The prompts shown in FIG. 2 can be varied as necessary based on the legacy program to provide an accurate description of the legacy program consistently. For the AMBGPTAI program example, the LLM 14 can produce a description 12 shown as shown in Appendix B hereto. As shown in the example of Appendix B, the LLM 14 can also create, as part of the process of generating the description 12, a call graph for the legacy program 20 that shows the calling relationships between subroutines in the legacy program 20. The nodes in the call graph can be chapters in the description 12.

The end user can download the description 12 from the backend computer system 15 so that a SME(s) that is familiar with the legacy code can verify that the description 12 generated by the LLM 14 is accurate. The SME(s) can be a business analyst(s) for the enterprise, a software developer for the enterprise, etc. The end user could be the SME and/or the end user could transmit or upload the description 12 so that the SME can review it. Also, if the legacy program 20 is large (in terms of lines of code, for example), the legacy program 20 could be broken into functional pieces or sections, with those discrete sections put through the process of FIGS. 1 and 2 to generate descriptions 12 for each discrete section (or "chunk") of the legacy program 20.

FIG. 9A shows experimental results of how long it takes, in seconds, for the LLM 14 to generate the English language description for various legacy programs as a function of the quantity of lines of code of the legacy program; and FIG. 9B shows experimental results for how long, in word count, the English language descriptions are as a function of the legacy programs' lines of code. The plots show that the relationships are generally linear, although programs of the same size could take longer and might require twice as many words to describe, depending on the complexity of the problem. FIG. 9A shows that the time to create the English language descriptions is relatively short (in many instances less than 500 seconds) and orders of magnitude shorter than it would take a human to perform the task.

With reference to FIG. 3, once the description is validated, the description 12 can then be used to generate an artifacts file 40 that captures, for example, the business rules, step orchestration, etc. of the legacy program 20. A configuration file 42 can then be generated from the artifacts file 40, where the configuration file 42 is run at run time by the enterprise's computer system 50 (e.g., order management system). The artifacts file 40 may include a rules data model, the rules, and outcomes from the rules, among other things, from the legacy program 20 for the enterprise's computer system 50. The rules data model may define the data model for the business rules of the enterprise's computer system 50. The rules may define the business rules for the enterprise's computer system 50. The outcomes may define the various outcomes and system message for the rules. A code generation system 45 can automatically generate the configuration file 42 from the artifacts file 40. The end user, for example, can download the artifacts file 40 from the backend computer system 15 and upload or store it electronically in a memory or repository that the code generation system 45 can access.

In various embodiments, the configuration file 42 comprises rules that are written in the target programming language, e.g., a programming language different from the legacy code program 20 in FIG. 1. For example, the legacy code program 20 could be written in COBOL or Sybase, for example, and the configuration file 42 could be written in Java, Python, .NET, etc. Java code might be the desired programing language, particular where a rules engine (not shown) of the enterprise computer system 50 uses dRools. dRools is a business rules management system (BRMS) with forward and backward chaining inference based rules engine. Such rules for dRools are often referred to as "DRLs." A rule engine of the enterprise's computer system 50 can then execute the rule code in the configuration file 42 at runtime to implement the logic of the rules embodied in the artifacts file 40 (and thereby the rules in the original legacy code 20).

FIG. 10 depicts a computer-based, automatic rule code generation system 45, according to various embodiments, that converts the artifacts file 40 into the configuration file 42 for the enterprise computer system 50 to run at compile time. The artifacts file 40 generated by the LLM 14 (via the prompting) may specify rule parameters, criteria and conditions for the enterprise computer system from the description 12. The artifacts file 40 can be uploaded, transmitted or otherwise stored on the automatic rule code generation system 45. In various embodiments, the artifacts file 40 may comprise a spreadsheet file, although other human-readable file types could be used to specify the rules. In various embodiments, the artifacts file (e.g., spreadsheet) may include a rules data model sheet, a rules sheet, and an outcome sheet, among other sheets. The rules data model sheet, an example of which is shown below in FIG. 11, may define the data model for the rules. The rules sheet, an example of which is shown below in FIG. 12, may define the business rules. And the outcomes sheet, an example of which is shown in FIG. 13, may define the various outcomes and system message for the rules. The automatic rule code generation system 45 automatically generates the configuration file 42 from the artifacts file 40. In various embodiments, the configuration file 42 comprises rules that are written in Java code (different from the programming language of the legacy program 20), particularly where a rules engine (not shown) of the enterprise computer system 50 uses dRools, which is a business rules management system (BRMS) with forward and backward chaining inference based rules engine. Such rules for dRools are often referred to as "DRLs." The rules engine of the enterprise computer system 50 can then execute the rule code in the configuration file 42 at runtime to implement the logic of the rules embodied in the artifacts file 40 generated by the LLM 14.

FIG. 11 shows an example rules data model for an order management system that specifies various entity models. As shown in the example of FIG. 11, for an order management system, the entities may include, as shown in the column A, accounts, positions, securities, transactions, and any other entity types that are used or required for the particular order management system. Each entity type could have one or many "field names" that are listed separately in column B for the various entity types. The "type" column (column C) may specify the type of each field name, e.g., whether it is a string, a list of strings, a Boolean expression, a map, etc. or any other applicable type for the field name for the particular implementation. In some embodiments, collections and custom data types are supported in the rule expressions. For example, a "collection" data type could specify in the type column of the data model a collection of strings or a collection of Boolean expressions. Also, custom objects could be used as the data type. That way, rules could be defined using a collection of strings, a collection of Boolean expressions, a custom data type or a custom object.

Each entity-field name combination could also have a field type identified in column D and a data service to be called in column E if applicable. The data service can indicate which back-end data service can be called to obtain the data. Where applicable, the valid values for the entity-field name combination in a row can be specified in column E. Some entity-field name combinations may only have a limited number of valid values, such as yes, not, true, false, success, failure, etc. If there is not a limited number of valid values for an entity-field name combination, this column can be left blank. Finally, the rules data model may include a description for the entity-field name combinations. In that way, the data model for the various entities can be defined. FIG. 11 only shows a few entity types and suggests only a few field names for each listed entity type. In practice, the rules data model may include as many different entity types as needed and as many different field names for each entity type as needed.

The rules sheet, an example of which is shown in FIG. 12, specifies the rules to be implemented by the rules engine of the order management system 50. The rules sheet may have any desired and appropriate number of columns, and preferably includes the following columns as shown in FIG. 12: a Rule ID column that specifies a unique rule ID for each rule; product applicability columns that specify which products (e.g., financial security types) that the rules apply to (e.g., a "Y" indicates that the rule applies to the indicated product type); a rule name column that specifies a unique rule name for the rule; a rule expression column that precisely specifies the rule; and a rule description column that textual summary or description of the rule. The rule expressions should be precise and can be expressed in simple Boolean logic expressions. For example, a rule expression could be that the value for a certain data field matches (or does not match) particular values set in brackets, such as "data.field is not {"x", "y", "z" }" or "value>999" or data.field is Empty, etc. Expressing rules in such a manner is far simpler and easier to understand than expressing the rules in programming languages like Scala, for example. Further, the automatic rule code generating system 45 can parse the expression to extract the rule logic when expressed in this form.

The outcomes sheet, an example of which is shown in FIG. 13, specifies the outcomes when a rule is triggered. The outcomes sheets may have any desired and appropriate number of columns, and preferably includes the following columns as shown in FIG. 13: a rule ID and rule name columns whose entries are linked to and/or match the rule ID and rule name columns, respectively, in the rules sheet (see FIG. 12); an outcome column that specifies the outcome of the rule when it is triggered; and a rule message column that specifies a system message that is displayable to a user explaining why the rule applies. As shown in FIG. 13, possible entries in the outcome column are failure (e.g., the trade order was rejected due to the rule), warning (e.g., the trade order was accepted by a warning was triggered), and manager approval (e.g., a manager has to decide whether to approve the trade order).

The LLM-generated artifacts file 40 can define, via prompting and the description 12, the rules, including their outcomes, to be applied by the enterprise computer system 50. The automatic rule code generation system 45 can programmatically capture the logic of the rules and the rule metadata and, based thereon, generates the configuration file 42 to be executed by the rules engine of the enterprise computer system 50 at runtime. In various embodiments, as shown in FIG. 10, the automatic rule code generation system 45 may include a JSON (JavaScript Object Notation) generator component 55, which generates, for example, JSON metadata for the rules from the artifacts file 40. The JSON generator component 55 preferably applies validations, row by row, for the rules sheet of the artifacts file 40, to generate the JSON metadata for the rules that embeds the logic of the rules.

The automatic rule code generation system 45 may also comprise a DRL generator component 53. In a preferred embodiment, the DRL generator component 53 generates the rule code (e.g., DRLs) for the configuration file 42 in the dRools language based on the JSON metadata generated from the artifacts file 40 by the JSON generator 55. The DRL generator component 53 may, for example, read the rules from the JSON metadata, validate and substitute the values in defined DRL templates. The DRLs in the configuration file 40 can be stored in a memory of the rules engine of the enterprise computer system 50 and executed at runtime. In that way, the rules engine of the enterprise computer system 50 executes the rules specified in the LLM-generated artifacts file 40.

In various embodiments, the LLM 14 generates and saves the tables in FIGS. 11, 12 and/or 13 as spreadsheet files that the end user can download. Additionally or alternatively, the LLM 14 could output the tables in formats such as plain text, markdown, HTML, and CSV.

More details about the rule code generation system are provided in U.S. Pat. No. 10,867,351, issued Dec. 15, 2020, assigned to Morgan Stanley Services Group Inc., by inventors Kumar Vadaparty et al., which is incorporated herein by reference in its entirety.

In another embodiment, the LLM 14 is directed, via prompts, to generate the configuration file 42 directly, as shown in the example of FIG. 4. The enterprise computer system 50 can then execute the configuration file 42 at runtime.

FIGS. 3 and 4 both show that the LLM 14 is directed to generate its output (e.g., either the artifacts file 40 in FIG. 3 or the configuration file 42 in FIG. 4) based on prompts that are specific to the use case, e.g., the enterprise computer system 50 that will use (that is, execute) the new code in the target language (e.g., Java or Python). As shown in FIGS. 3 and 4, the prompts to generate the target language code include two sets of prompts 47, 48. The first set of prompts 47 can include prompts to specify the target programming language (e.g., Java or Python) and to specify architecture of the enterprise computer system 50 (e.g.: does it have rules engine? An orchestration engine? Does it use a mainframe architecture? Etc.). The second set of prompts 48 can provide domain specific metadata about the enterprise computer system 50 that will run the new code in the new, target programming language. For example, where the enterprise computer system 50 is used as an order management system for trading equities, the prompts can include metadata about the orchestrated steps that the enterprise computer system 50 performs, the formatting of the data messages that it sends and receives, etc.

The embodiments of FIGS. 3 and 4 assumed that the enterprise computer system 50 comprises a rules engine to run the rules in the configuration file. In other embodiments, the architecture could be used to generate different types of programs, or files, in new programming language to be run/executed by the enterprise computer system 50. For instance, in the example of FIG. 5, based on the prompts 47, 48, as well as the description 12, the LLM could generate a new code file 51 in the target programming language (e.g., Java, Python, etc.) to be run (or executed) by a processor of the enterprise computer system 50. The new code file 51 could be used for other types of programs to be run by the enterprise computer system 50 than a rules engine. In such an embodiment, the first set of prompts 47 might include a directive to write a program that performs the operations of the legacy code 20, based on the English language description 12, in the target language, and based on the architecture prompts as well as the domain specific metadata prompts. In such an embodiment, the end user, for example, can download the file 52 in the target programming language from the backend computer system 15 and upload or store it electronically in a memory or repository that the enterprise computer system 50 can access.

Cobol programs can be in some instances relatively large, such as 2000 or 3000 lines, or even longer. LLMs tend to provide less accurate output when provided with large inputs. As such, the LLM might not provide an accurate English description 12 if a large legacy Cobol program 20 is uploaded to the LLM 14 in one shot. Accordingly, in various embodiments, the legacy (e.g., Cobol) program can be broken down, e.g., "chunked," into smaller, manageable segments for the LLM 14. For each segment, the corresponding code along with the prompts can be forwarded to the LLM 14 for translation into an English language description for the respective segments. This procedure can be repeated sequentially for each segment/chunk of the legacy program 20 until all sections of the code have been processed by the LLM 14. Once all individual translations 12 are complete, the user (or any computer system associated with the user or the enterprise) can amalgamate the individual translations 12 into a single comprehensive document in English such that the single comprehensive document can be validated by an SME. Thereafter, as explained above, the LLM 14 can generate, from the validated English language description 12 of the legacy program 20, the program in the corresponding program in the target programming language (e.g., Java or Python).

As an example, a large legacy program 20 could be segmented/chunked using a call graph for the legacy program 20. A call graph for a computer program is a graphical representation of the calling relationships between different functions or procedures within the program. Each node in the graph represents a function or subroutine, and each directed edge represents a function call from one function or subroutine to another. The legacy program's code could be segmented/chunked such that each segment/chunk corresponds to one or more nodes of the call graph.

Additionally, as shown in FIG. 6, the LLM 14 can be used to generate a test script model 60 for, for example, a test orchestration engine (not shown) of the enterprise computer system 50. Again, two sets of prompts can be used to generate the test script model: language and architecture prompts 47 and domain specific metadata prompts 48. The test orchestration engine can generate test scripts for various target apps of the enterprise computer system 50 to be tested based on the test script model 60. The test script model 60 can include (based on prompts to the LLM 14) various tables that specify attributes and parameters for the test scripts for the apps of the enterprise computer system 50. The test script model 60 may be embodied as a spreadsheet, for example. The test orchestration engine of the enterprise computer system 50 can convert the test activities defined in the test script model 60 into code artifacts at compile time for the test orchestration engine to use at run time for testing the apps of the enterprise computer system. The artifacts may include meta-data representations of the activities to be performed as part of the tests.

The test script model 60 can be stored in a memory of the test orchestration engine, which can convert the test script model 60 at compile time to meta-data code artifacts to be stored in memory of the test orchestration engine and used by the test orchestration engine at runtime to test the apps of the enterprise computer system 50 according to the attributes, parameters, etc. specified in the test script model 60. The code artifacts should be in a format suitable for use by the test orchestration engine. In various embodiments, the code artifacts may be written in Extensible Markup Language (XML), or JavaScript Object Notation (JSON), for example.

The test script model 60 may include one or more codeless test script models, script models, app models and resource models that are linked and that collectively provide the necessary information for the test orchestration engine to generate the metadata code artifacts for the testing of the apps of the enterprise computer system 50. A test script can be a defined sequence of activities to be executed by the test orchestration engine at runtime. The testing framework can utilize reusable functions which are used in these activities. The orchestration engine can use an app model (not shown) and the scripts model 60 to generate the test scripts. The app model and scripts model 60 can be configuration models. The app model allows separation of application-specific information from the test scripts owned by the application development team. For example, application-specific attributes may comprise data properties for the apps. That is, for example, the application-specific attribute for an app can specify the type of data and corresponding data values to be used by the application for the testing. This approach separates the test script from the underlying application model, eliminating the need to update potentially thousands of test scripts as the application changes. That is, testing activities specified in the test script model 60 can be updated independent of the application-specific data attributes in the application model and vice versa. The script models 60 allow context parameters for the tests to be passed to the testing activities being executed in a codeless manner.

FIG. 14 illustrates an enterprise computer system 50 according to various embodiments of the present invention. In the illustrated embodiment, the enterprise computer system 50 comprises several applications ("apps") 202, 204, 206, 208 to be tested. The apps include a user interface (UI) app 202, a middle tier app 204, a database app 206 and a mainframe app 208. These apps may run on respective sub-systems of the enterprise computer system 50. For example, the UI app 202 may run on an application server of the enterprise computer system 50; the middle tier app 204 may run on a middle tier sub-system; the database app 206 may run on a database sub-system; and the mainframe app may run on a mainframe sub-system.

The middle tier 204 represents an app run by a middle tier sub-system of the enterprise computer system 50. The database app 206 represents an app that makes calls to a database of the enterprise computer system 50 The mainframe app 208 represents an app run by a mainframe component/sub-system of the enterprise computer system 50. FIG. 14 depicts only one UI app 202, one middle tier app 204, one database app 206 and one mainframe app 208 for illustrative purposes. It should be recognized that the enterprise computer system 200 could, and likely does, include numerous instances of each type of app.

The illustrated enterprise computer system 50 also includes a test orchestration engine 210, which can generate test scripts for the various target apps 202, 204, 206, 208 to be tested based on the LLM-generated app test script model 60. The app test script model 60 may include various tables that specify attributes and parameters for the test scripts for the apps 202, 204, 206, 208. The app test script model 60 may be embodied as a spreadsheet, for example, or other suitable tabular format. The test orchestration engine 210 converts the test activities defined in the app test script model 60 into code artifacts at compile time for the test orchestration engine 210 to use at run time for testing the apps 202, 204, 206, 208. The artifacts may include meta-data representations of the activities to be performed as part of the tests.

The app test script model 60 can be stored in a memory of the test orchestration engine 210 and the test orchestration engine 210 can convert the app test script model 60 at compile time to meta-data code artifacts to be stored in memory of the test orchestration engine 210 and used by the test orchestration engine 210 at runtime to test the apps 202, 204, 206, 208 according to the attributes, parameters, etc. specified in the app test script model 60. The code artifacts should be in a format suitable for use by the test orchestration engine 210. In various embodiments, the code artifacts may be written in Extensible Markup Language (XML), or JavaScript Object Notation (JSON), for example.

The test orchestration engine 210 may be in communication with the apps 202-208, and the respective subs-systems on which they run, via one or more data communication networks, such as a LAN or WAN of the enterprise, for example. The illustrated enterprise computer system 50 may include a number of adapters 222, 224, 226, 228 to provide interfaces between the test orchestration engine 210 and the respective apps 202, 204, 206, 208. For example, the enterprise computer system 50 may include a UI adapter 222 for interfacing with the UI app 202; a middle tier adapter 224 for interfacing with the middle tier app 204; a database adapter 226 for interfacing with the database app 206; and a mainframe adapter 228 for interfacing with the mainframe app 208. The UI adapter 222 may comprise, for example, a Selenium adapter. Selenium is a portable framework for testing web applications. The middle tier adapter 224 may comprise, for example, a Representational State Transfer (REST) adapter and/or a MQ adapter. A REST adapter can enable exchange messages between the test orchestration engine 210 and the middle tier app 204, and can support dynamic URLs, REST API polling, multiple operations per channel as well as XML and JSON data formats. MQ is a family of message-oriented middleware products that allows independent and potentially non-concurrent applications on a distributed system to securely communicate with each other using messages. The mainframe adapter 228 may comprise a SOAP (Simple Object Access Protocol) adapter that exchanges SOAP message between the test orchestration engine 210 and the mainframe app 208. SOAP is a messaging protocol specification for exchanging structured information in the implementation of web services in computer networks. It uses XML Information Set for its message format, and relies on application layer protocols, most often Hypertext Transfer Protocol (HTTP), although some legacy systems communicate over Simple Mail Transfer Protocol (SMTP), for message negotiation and transmission. The adapters 222, 224, 226, 228 can be separate from the test orchestration engine 210. That way, the adapters 222, 224, 226, 228 can be changed or replaced without affecting the test orchestration engine 210.

The app test script model 60 may include one or more codeless test script models, script models, app models and resource models that are linked and that collectively provide the necessary information for the test orchestration engine 210 to generate the metadata code artifacts for the testing of the apps 202-208. As described further below, a test script can be a defined sequence of activities to be executed by the test orchestration engine 210 at runtime. The testing framework can utilize reusable functions which are used in these activities. The app model and the scripts model can be configuration models. The app models allow separation of application-specific information from the test scripts owned by the application development team. For example, application-specific attributes may comprise data properties for the apps, such as, for example, user interface element locators for the UI app 202. That is, for example, the application-specific attribute for an app can specify the type of data and corresponding data values to be used by the application for the testing. This approach separates the test script from the underlying application model, eliminating the need to update potentially thousands of test scripts as the application changes. That is, testing activities specified in the test script model can be updated independent of the application-specific data attributes in the application model and vice versa. The script models allow context parameters for the tests to be passed to the testing activities being executed in a codeless manner.

In various embodiments, the models of the app test script model 60 can be considered "codeless" because they preferably do not include software code. Instead, they can be embodied as tables in a spreadsheet or other tabular format. For example, the app test script model 60 could be embodied as an Excel spreadsheet, or other type of spreadsheet, with tables for the test script, script and app models. For examples, the various models could be on separate sheets of the spreadsheet.

FIG. 15 is a table that shows an example test script model 60. The example shown in FIG. 14 includes two test scripts, TestScript1 and TestScript2, for illustrative purposes. In the illustrated embodiment, each test script includes a number of activities that are identified by Activity Group, Activity ID, Activity Name and Function. The numbering of the Activity Group indicates the order in which the activities of the test are performed. Activity ID is an ID number for the activity in the test script. Activity Name is a name for the activity, which may be user-defined. Function may indicate a function in the library of functions available for the test orchestration engine 210, which can be provided to the LLM 14 prompts or the LLM 14 can be adapted with fine tuned training about the library of functions. Different test scripts may utilize the same library function or functions. Indeed, some different test scripts may utilize the exact same functions, in the exact same order, but for different applications and/or different values and parameters. The Application Model field identifies the app that the test scrip is for testing. For example, the Application Model field can identify one of the apps 202, 204, 206, 208 in FIG. 14.

The set/get field can be used to specify the values or parameters for the applicable Function of the activity. For example, the set/get field can specify values or parameters, e.g., A, B, C and D, in FIG. 3 that are "set" by the function of the activity, as well as the operation, e.g., P, of the identified function to use on the set values. The operation could be something like comparing the set values or some similar or more complex operations. Finally, the Comments field can provide text that describes the activity for a reader of the app test script model 60.

FIG. 16 is a table that shows an example script model. In the illustrated example, the first column can identify the application for the test, i.e., one of the applications 202, 204, 206, 208. For example, the application listed in the Application column corresponds to an application listed in the Application column of the test script model shown in FIG. 15. The Activities column can list one or more of the activities specified in the Activity Name column of a test script in the test script model (see FIG. 15). In the Attribute Type column, the LLM 14 can select from a pre-defined list of attribute types for the activities and the Attribute Value Type field can identify the type of value for the attribute, such as a scalar or key value pair. Next, the Attribute Value field can specify the name for the attribute for the activity (ies) listed in the Activities column. The applications listed in the first column of FIG. 16 are the same ("App1"). The script model could have multiple different applications in the first column along with their corresponding activities and attributes. In other embodiments, there could be multiple script model sheets in the model 60, each for one or more applications (e.g., one or more different applications listed in the "Application" column).

Again, the LLM 14 can generate and save the tables in test script model 60 as spreadsheet files that the end user can download. Additionally or alternatively, the LLM 14 could output the tables in formats such as plain text, markdown, HTML, and CSV. The end user, for example, can download the configuration file 42 from the backend computer system 15 and upload or store it electronically in a memory or repository that the enterprise computer system 50 can access.

More details about test scripts can be found in U.S. Pat. No. 11,392,486, titled "Multi-role, multi-user, multi-technology, configuration-driven requirements, coverage and testing automation," issued Jul. 19, 2022, assigned to Morgan Stanley Services Group Inc., by inventors Kumar Vadaparty et al., which is incorporated herein by reference in its entirety.

The end user, for example, can download the test script model file 60 from the backend computer system 15 and upload or store it electronically in a memory or repository that the enterprise computer system 50 can access.

In various embodiments, the enterprise might run the new, target language code files in parallel with the legacy code to perform quality assurance on the new, target language code before using the new, target language code in production. FIG. 7 illustrates such an embodiment. In the illustrated embodiment, the LLM receives outputs from the enterprise computer system 50 using the legacy code 20 and receives outputs from the enterprise computer system 50B using the new, target code 51. Both sets of outputs could be generated from identical inputs. For example, in the case where the enterprise computer system 50 is an order management system, the inputs could be particular trade orders.

In this embodiment, the prompts to the LLM 14 can be directive to compare the outputs. The prompts can be directives for the LLM 14 to compare the outputs of individual functions performed by the programs 20, 51 so that there is a function-by-function comparison of the programs. Another way to do this is for the outputs to be outputs from individual functions of the programs 20, 51, so that LLM 14 makes the function-by-function comparison. A subject matter expert(s) could review the comparisons 55 generated by the LLM 14 to determine if the target program 51 performs identically to the legacy program 20. Once it is determined that the target program 51 performs sufficiently identically to the legacy program 20, the legacy program 20 can be decommissioned and the enterprise computer system 50 can switch over to using the new, target programming language program code 51 in production. In such embodiments, the end user, for example, can download the comparison file 55 from the backend computer system 15.

Embodiments of the present invention can also be used to translate a computer program in a legacy language, such as Perl, directly to a computer program in the target programming language, such as Python, without having the LLM generate a human language description of the legacy program (see element 12 in FIG. 1) as an intervening step. Such embodiments are described herein as being used to convert legacy Perl programs to target Python programs, recognizing that the embodiments are not necessarily so limited and could be applied to other legacy and/or target programming languages.

Perl was once a leading scripting language for various applications, including system administration, web development, and network programming. Its flexibility and powerful text processing capabilities made it a popular choice for many developers. However, as newer languages emerged, Perl's popularity decreased. Despite this decline, many legacy systems still rely on Perl for their operations. These systems often play crucial roles in businesses, and their stability and functionality are of critical importance. Transitioning from Perl to Python can breathe new life into these legacy systems, ensuring they remain maintainable and scalable in the long term.

The pool of developers proficient in Perl has been shrinking over the years. As experienced Perl developers retire or move on to other technologies, the number of professionals capable of maintaining Perl-based systems diminishes. This scarcity poses a significant risk to organizations that rely on Perl. Without enough skilled developers, maintaining and updating these systems becomes increasingly difficult. This lack of subject matter expertise (SME) can lead to production instability and an increase in change-related incidents due to improper handling of the codebase. Converting Perl code to Python helps eliminate this risk as a strategic approach by making it easier to find and train developers to maintain the systems.

Maintaining legacy Perl systems without adequate expertise often leads to errors and inefficiencies. These issues can result in production outages, which can have severe consequences for business operations. Bugs introduced during updates or modifications can disrupt services, leading to customer dissatisfaction and potential revenue loss. The complexity of Perl code, combined with the scarcity of skilled developers, makes the risk of such incidents even higher. By converting Perl code to Python, organizations can utilize the larger pool of Python developers to ensure their systems remain stable and reliable. This transition reduces the risk of production outages and helps maintain business continuity.

Most teams responsible for maintaining legacy Perl code are operating with diminished resources, often enough to ensure these systems continue to function. Undertaking the conversion of each Perl script into Python to address the inherent risks requires significant investment in modernization efforts. Without the aid of generative AI, this process would be highly labor-intensive, demanding extensive manual coding and validation. Embodiments of the present invention can significantly alleviate this burden, reducing the manual effort needed for the conversion by 60% to 80%. This efficiency gain allows teams to adopt a strategic, gradual "chipping away" approach, managing the transition as a background task without overwhelming their resources.

Unlike the embodiment described above in connection with FIG. 1, a Perl-to-Python conversion is preferably a direct code-to-code translation by the LLM, which presents unique challenges. Prompt engineering for the LLM becomes crucial in this context, as it ensures that the AI model accurately understands and translates the dense and compact logic of Perl scripts.

Perl scripts are known for their compact and dense logic, often making them more complex than Cobol programs. Perl's syntax allows for concise expressions of complex operations, which can make the code difficult to read and translate. This high density of logic means that translating Perl requires careful consideration to preserve the intricate details of the original code. The AI model needs to accurately capture not only the business logic but also the specific formatting and output requirements embedded in the Perl scripts. This complexity necessitates advanced prompt engineering techniques to ensure a high-fidelity translation.

Perl code is frequently part of complex ETL processes that depend on precise formatting for data output. Any deviation from the expected format can disrupt downstream processes and cause errors in production. Ensuring these details are retained in the Python code is essential to maintaining production stability. The conversion process, therefore, preferably accounts for these specifics to ensure a seamless transition from Perl to Python.

In various embodiments, the Perl-to-Python conversion process employs algorithmic looping through all functions in the output Python code. Unlike the Cobol to Java conversion that used input chunking, the Perl to Python process can utilize output-based chunking. This method can involve refactoring monolithic Perl code into modularized Python functions and iteratively generating each function by referencing the original Perl logic. This approach allows for a more structured and manageable conversion process, ensuring that the translated code remains coherent and functional. By breaking down the monolithic Perl scripts into smaller, modular Python functions, the conversion process becomes more efficient and easier to manage.

To manage the high density of Perl logic and avoid breaking the LLM's tokenizer, the conversion process can employ prompting that ensures that even complex and densely packed Perl scripts are accurately and effectively translated into Python. The LLM is trained to recognize and preserve the intricate details of Perl code, ensuring that the translated Python code retains the same functionality and performance. This careful handling of high-density logic helps maintain the integrity of the original Perl code and ensuring that the translated code functions as expected.

One embodiment for converting Perl to Python is to make the LLM maintain the original context in its working memory, and then generate the Python code one function at a time. This method circumvents the output token optimization that is built into the LLM, which often results in the loss of important details. Various embodiments of the present invention solve this by engineering the prompts so that the LLM maintains a list of placeholder functions that need to be expanded. The LLM iterates through this list, expanding one function at a time until all functions are complete. This approach ensures that each function is accurately translated while preserving the context of the entire script. By maintaining a clear and structured process, the LLM can effectively manage the complexity of the translation, resulting in high-quality and reliable Python code.

Currently, converting a single 500-line Perl program line Perl program to Python takes about 40 hours, or one week, for a typical developer. The process is cumbersome and time consuming. It requires understanding and describing the legacy Perl program, which can involve the developer picking up an unknown Perl program and reverse engineering it to create a Requirements Document in plain English. This takes about one day. The purpose is to evaluate and rationalize whether the script is still relevant. Next, the manual process involves forward engineering into python. This can involve planning how to break the usually monolithic Perl code into smaller, more manageable functions and implementing these in Python. This step takes about three days. Finally, unit tests should be added, which can involve starting with black box testing of both the original and converted programs when run from the command line, and then adding unit tests using Python's testcase library to test out individual functions. This takes another day.

Embodiments of the present invention can reduce this process to a handful of hours with high accuracy and significant productivity gain. In embodiments of the present invention, the LLM provides an immediate, one-shot translation of the legacy Perl program into Python that is 100% accurate and repeatable, requiring no additional manual effort. Some tweaks can be made to the Python program to integrate its separate outputs into a cohesive script and to update specific patterns, such as Kerberos connections, MQ connections, and database connections via interface files, to fit the enterprise's internal standards that the LLM is unaware of. This step takes about 3 hours instead of 24 in the manual process. Also, this step could even be eliminated or enhanced (i.e., sped up) by adding some training context into the LLM's sessions. Similar to the forward engineering process, the generated unit tests are mostly correct but need minor adjustments for consistency with the enterprise's patterns. The time to generate the unit tests is about 1 hour instead of 8 hours in the manual process.

The conversion process can vary depending on the length (e.g., number of lines) of the legacy Perl program. Most Perl programs are less than 500 lines, so, for example, different processes can be used for Perl programs that are (i) less than 75 lines, (ii) between 75 and 200 lines, and (iii) between 200 and 500 lines. Programs under 75 lines can be converted immediately by the LLM with a one shot process. Programs between 75 and 200 lines can require a few pre-determined prompts. For programs between 200 and 500 lines, the prompting can cause the LLM to keep the entire program and the generated code in memory, producing results iteratively. This is preferably managed through manual nested prompts, though the prompts themselves are given by LLM working under a user's wrapper. In other embodiments, the series of nested prompts can be automated.

With reference to the architecture diagram of FIG. 17 and the flow chart of FIG. 18, the following describes an example set of prompts that a user 16 can provide to the LLM 14 to generate a Python program 200 from a legacy Perl program 20. The first prompt, at step 210, can explain to the LLM 14 what the general task is, provide a context, and provide a number of rules for the LLM. The first prompt can be, for example:

"You are an expert in Perl, Python, and refactoring legacy code into modularized, easy to test, Python code. You will output only in Python code. Any explanations you need to provide about the code will be placed in block comments in the Python code. Understand the Perl code given in the following prompts. Your objective is to convert the code into Python. You will accomplish this through iteratively repeating the following steps:

Rule 1. Understand the entire Perl code, including the main method and all the subroutine branches.

Rule 2. Come up with 3 different approaches to break the code into modularized Python code, with the main process flow in the main( ) method. Then pick the best method.

Rule 3. Only expand one function at a time, keeping 100 lines or less in the function body being expanded, and push any detail logic to sub-functions.

Rule 4. For each new sub-function created, come up with the right calling signature, but leave the function definition as a placeholder. Put a comment "TBD—expand this" in the function body to mark it for a later revisit.

Rule 5. Only implement the function asked for, or the main( ) method when starting.

Rule 6. Ensure every line of logic in the original Perl code is accurately transferred to the Python code.

Rule 7. You will output only in Python code. Any explanations will be output as block comments in Python.

Rule 8. Maintain full context from the original Perl script and any Python code previously generated. Each iteration should focus on expanding a few functions at a time, including placeholders for any new functions introduced. Each iteration will only print out the new code generated.

Rule 9. The last line of your code output will be a comment with the next prompt you would like me to give to continue the iterative migration of the original Perl code."

Note that in Rule 3, the LLM is only to expand one function at a time, keeping 100 lines or less in the function body being expanded, and to push any detail logic for the function to sub-functions. A different limit ("N") besides 100 lines could be used in other embodiments. Rule 4 used the abbreviation "TBD" as the marker for the sub-functions. Any word, abbreviation or phrase (each a "lexical unit") that is unlikely to appear in the legacy Perl program, the Python program, or the general English text generated by the LLM can be used instead (e.g., coined, nonce or nonsense words/phrases could be used). Also note that pursuant to Rule 9, the LLM 14 is to provide next prompt to continue the iterative migration of the original Perl code 20.

The LLM's response to the first prompt may be that it needs to see the legacy Perl code 20. In response to this response, at step 212, the user can upload the legacy program 20 to the LLM 14, or type and/or copy/paste it into the LLM's user interface.

In response to receiving the legacy program, and based on the first prompt, the LLM 14 can generate, at step 214, an initial Python code output that identifies modules to be imported into the Python program, provide a placeholder for environment variables, define functions in the legacy program, and tag sub-functions for the functions in the legacy program 20 to be expanded with the marker "TBD—expand this." Pursuant to Rule 9, the LLM's response can also include, as a line of the code, the next prompt, which can be something like: "#Next prompt: Please provide the expansion for the 'XYZ1' function," where 'XYZ1' is one of the functions identified by the LLM by "TBD."

The user's next prompt, at step 216, could therefore be "Please provide the expansion for the 'XYZ1' function," which causes the LLM 14, at step 218, to generate the Python code for the XYZ1 function. If there are more functions to expand, the LLM's response, at step 220, can include "#Next prompt: Please provide the expansion for the 'XYZ2' function," where 'XYZ2' is another of the functions identified by the LLM by "TBD."

This iterative process of expanding one function and identifying, as next prompt for the LLM, the next function to be expanded can be repeated until all of the functions identified by the LLM are expanded. When the LLM considers itself to have expanded all of the identified functions, pursuant to the first prompt, it can provide a next prompt, at step 222, of, for example, "#Next prompt: Please review and provide any necessary adjustments or additional functions needed to complete the migration." The user then can, at step 224, provide that prompt to the LLM 14, which can, in response to the prompt, review the Python code that it has created so far to make observations about the code and potential adjustments. The response, at step 226, can include observations and suggestions from the LLM 14 that can include, for example, ensuring that all functions use a consistent error handling strategy, that the database and MQ operations should handle specific database and MQ exceptions, suggestions for ensuring handling of sensitive data, etc. The LLM's response can also include a suggested next prompt of, for example, to implement one or more of its suggested changes to the Python code. At step 228, the user can provide the prompt to implement one or more (or all) of the suggested changes, which the LLM 14 can generate at step 230. The LLM's response at step 230 can also include explanations for the adjustments and identify key points for the adjustments. The user can then provide, at step 232, a next prompt to the LLM 14 to write unit tests on the generated Python code using, for example, a testcase unit test library. At step 234, the LLM can generate the unit tests using the testcase unit test library. At this point, the new Python code is generated, along with unit tests for it and they are ready for execution by the enterprise computer system 50. In that connection, the new Python code and test scripts can be uploaded from the user device to a memory or computer storage from which the enterprise computer system can execute them.

The enterprise computer system 50 was generally described above, for the sake of example, as being order management systems that had a rules engine and/or an orchestration engine. The present invention is not so limited, and it could be used for other types of enterprise computer systems where code in a new, target language is desired or preferred. In that connection, the enterprise computer system may be implemented with a mainframe computer, a server-based architecture, and/or a container-based architecture, for example. In a mainframe-based architecture, the mainframe serves as the central processing unit, handling core computing tasks. Mainframes often run multiple virtual machines (VMs) or partitions to support different workloads simultaneously. Virtualization technologies like IBM z/VM or z/OS can be employed to manage these virtualized environments efficiently. In a server-based architecture, multiple servers are employed to distribute the workload and provide scalability and redundancy. A load balancer can be used to evenly distribute incoming requests among multiple servers to optimize performance and ensure high availability. Servers may be organized into tiers based on the application's requirements, such as web servers, application servers, and database servers. Each server typically runs a specific set of services or applications, such as web hosting, database management, or application logic. Virtualization technologies like VMware, Hyper-V, or KVM can be utilized to maximize resource utilization and flexibility. Containers provide lightweight, isolated environments for running applications and services. A container orchestrator, such as Kubernetes or Docker Swarm, manages and orchestrates containers across a cluster of servers. Containers package applications and their dependencies into a single unit, making it easy to deploy, scale, and manage. Microservices architecture is often adopted with containers, where applications are broken down into smaller, loosely coupled services. Containerized applications can be deployed consistently across various environments, from development to production, ensuring consistency and portability.

FIG. 8 is a high-level, generalized diagram of a LLM that could be used in various embodiments of the present invention. An LLM is a type of artificial intelligence algorithm that applies neural network techniques with many parameters to process and understand human languages or text using self-supervised learning techniques. LLMs operate on the principles of deep learning, leveraging neural network architectures to process and understand human languages. The LLM 100 preferably is trained on vast datasets using self-supervised learning techniques. The core of the LLM's functionality lies in the intricate patterns and relationships it learns from diverse language data during training. The LLM 100 preferably consists of multiple layers, including feed-forward layers, embedding layers, and attention layers. The LLM 100 may employ attention mechanisms, like self-attention, to weigh the importance of different tokens in a sequence, allowing the model to capture dependencies and relationships.

The example of FIG. 8 shows a transformer based LLM model, which is a type of neural network architecture designed for natural language processing (NLP) tasks and which could be used for the LLM 14. The key components of a transformer model include an encoder-decoder architecture, a self-attenuation mechanism, a feed-forward neural network (FFNN), positional encoding, and layer normalization and residual connections. Tokens are the basic units of input that a transformer network, such as the transformer network of FIG. 8, processes. They can represent words, subwords, characters, or other elements, depending on the tokenization method used. Tokens are discrete elements that the model uses to understand and generate text. They are numerical representations of the textual data that the model processes. Tokens come from a process called tokenization, which converts raw text into a sequence of tokens. After tokenization, tokens are usually converted into numerical representations (token IDs) that the model can process. This is done using a vocabulary, which maps each token to a unique integer. These token IDs are then transformed into dense vectors (embeddings) that capture semantic information. Embeddings are high-dimensional representations where tokens with similar meanings are located close to each other in the vector space.

The encoder 112 can take an input sequence and transforms it into a sequence of continuous representations. An input embedding layer 114 can convert words or tokens into dense vectors of fixed size. Positional encoding 116 can add information about the position of each token in the sequence since the model does not inherently understand order. These encodings are added to the input embeddings. A self-attention mechanism 118 allows the model to focus on different parts of the input sequence when encoding a particular token. It calculates a weighted sum of the input values, where the weights are determined by the similarity between the token being processed and other tokens in the sequence. A feed-forward neural network (FFNN) 120 can apply a two-layer fully connected network to the output of the self-attention mechanism. Each sub-layer (e.g., self-attention and FFNN) is followed by a residual connection (adding the input of the sub-layer to its output) and layer normalization to stabilize and speed up training.

The decoder 122 takes the encoder's output and generates the output sequence, one token at a time. Similar to the encoder, an output embedding layer 123 and positional encoding 124 converts output tokens into dense vectors and adds positional information. A masked self-attention mechanism 126 ensures that the prediction for a particular token depends only on the known outputs up to that position (i.e., the model cannot "cheat" by looking ahead). An encoder-decoder attention layer 128 allows the decoder to focus on relevant parts of the input sequence (the encoder's output) when generating each token of the output sequence. An output/decoder feed-forward neural network (FFNN) 130, similar to the encoder FFNN 120, applies a two-layer fully connected network to the output of the attention mechanism 128. Residual connections and layer normalization can be applied in the same manner as in the encoder.

Encodings in the transformer refer to the representations of tokens at various stages. The input embeddings comprise initial dense vector representations of the input tokens. The positional encodings are added to input embeddings to incorporate position information. Contextualized encodings are the representations produced by the self-attention and FFNN layers, which capture the context of each token in the sequence.

Attention allows the model to focus on different parts of the sequence when processing a token. It can involve Query (Q), Key (K), and Value (V) matrices that are derived from the input embeddings by multiplying them with learned weight matrices. Scaled dot-product attention can calculate attention scores by taking the dot product of the Query and Key matrices, scaling them down, and applying a softmax function to get the attention weights. These weights are then used to compute a weighted sum of the Value matrix, producing the attention output.

The softmax function 132 can covert the attention scores into probabilities, ensuring that they sum to one. In the context of attention, the softmax function 132 ensures that the attention weights highlight the most relevant tokens while maintaining a probabilistic interpretation.

The LLM 14 could also be adapted for a particular domain or context, such as a domain(s) specific to the enterprise computer system 50, via fine tuning of the LLM 14, which adjusts the pre-trained LLM's weights using domain-specific data to make it more effective for particular applications. Fine tuning can involve collecting a large and diverse dataset relevant to the specific domain or context. For example, for a financial services application, materials describing the financial services and/or the product of the financial services (e.g., trade data) could be used. This adaptation training data can be tokenized into smaller units (tokens) that the LLM 14 can process. The tokenization of the adaptation training data can use the same tokenization method as the base model of the LLM 14. The fine-tuning process can involve supervised fine-tuning (e.g. labeled data) where possible. The model is then trained on the domain-specific data, typically under supervised learning techniques. Fine-tuning can be done using frameworks like Hugging Face's Transformers library, TensorFlow, or PyTorch. The fine tuning can involve conventional hyper-parameter adjustments and validation of the model's performance.

The LLM can generate text (e.g., code in the target programming language) using a sophisticated next-word prediction mechanism. The model can be trained on a vast dataset of text from various sources. During training, it learns patterns, structures, and the statistical relationships between words and phrases in the text. This training process involves adjusting the model's parameters to minimize the error in predicting the next word in a sequence of text. When given a prompt and/or initial text, the model analyzes the context using its learned patterns. It takes into account the words and phrases that have already been provided to understand the context and meaning. Based on the context, the model generates a probability distribution over the potential next words. It uses this distribution to predict the most likely next word. This process is repeated word by word to generate coherent and contextually relevant text (e.g., software code). The model can use different strategies to choose the next word from the probability distribution. Common strategies include greedy sampling (choosing the word with the highest probability), top-k sampling (limiting the choices to the top k most probable words and sampling from them), top-p (nucleus) sampling (choosing words from the smallest set whose cumulative probability exceeds a certain threshold (p)), and/or temperature (adjusting the randomness of the predictions, where a lower temperature makes the model more conservative, while a higher temperature makes it more creative and diverse). The model repeats the process, using the newly generated word as part of the context for predicting the next word, continuing this until the desired length of text is generated or until it encounters a stopping condition (like a specific token indicating the end).

In one general aspect, therefore, the present invention is directed to computer-implemented systems and methods for converting a programming language of a legacy software program of an enterprise that is executed by an enterprise computer system of the enterprise to a software program in a target programming language that is different from the programming language of the legacy software program. The method can comprise, according to various embodiments, the steps of: uploading, from a user device to a large language model ("LLM") running on an AI computer system, a file with source code, written in a first programming language, of the legacy software program; prompting, from the user device, the LLM to generate, from the legacy software program, the software program in the target programming language; and generating, by the LLM, based on the legacy software program and the prompting, the software program in the target programming language. A system according to various embodiments can comprise a backend computer system that comprises a large language model ("LLM"); and a user device in communication with the LLM via an electronic data network. The user device is for uploading to the LLM a file with source code, written in a first programming language, of the legacy software program. and prompting the LLM to generate, from the legacy software program, the software program in the target programming language. The LLM is for generating, based on the prompting and the legacy software program and the prompting, the software program in the target programming language. The enterprise computer system is for executing software program in the target programming language.

In various implementations, the prompting comprises: first prompting, from the user device, the LLM to generate a description, in a human language, of the source code in the file for the legacy software program; generating, based on the first prompting, by the LLM the description, in the human language, of the source code in the file; validating, by a subject matter expert for the enterprise, the description in the human language of the source code in the legacy code file; after validating the description, second prompting, by the user device, the LLM to generate an output file that captures business rules of the legacy software program based on the description. The second prompting can comprise: prompting about an architecture of the enterprise computer system; and prompting with domain specific metadata for the enterprise computer system. The enterprise computer system can then execute a program code in the target programming language, where the program code in the target programming language is based on the output file. The LLM can comprise a transformer network with multiple layers (also called "blocks"), and within each layer, there are multiple attention heads. For example, the transformer network could have 12 to 96 or more layers, with each layer comprising 12 to 96 or more attention heads.

In various implementations, the second prompting further comprises a directive to the LLM to generate the program code in the target programming language; and the output file comprises the program code written in the target programming language.

In various implementations, the enterprise computer system comprises a rules engine; the output file comprises an artifacts file that captures business rules of the legacy software program based on the description; and executing the program code in a target programming language comprises: (i) generating, by a code generation computer system, a configuration file that comprises the business rules of the legacy software program written in the target programming language that is different from the first programming language, wherein the configuration file comprises the program code in the target programming language; and (ii) executing, by the enterprise computer system, the configuration file at runtime of the enterprise computer system.

In various implementations, the enterprise computer system comprises a rules engine; and the second prompting further comprises a directive to the LLM to generate a configuration file that comprises the business rules of the legacy software program written in the target programming language that is different from the first programming language, where the configuration file comprises the program code in the target programming language; and executing, by the enterprise computer system, the program code in the target programming language comprises executing, by the enterprise computer system, the configuration file at runtime of the enterprise computer system.

In various implementations, the first prompting for the LLM to generate the description, in the human language, of the source code in the file for the legacy software program, comprises multiple prompts, such as: a first prompt that instructs the LLM to include in the description an explanation of a general functionality of the legacy software program; a second prompt that instructs the LLM to provide a detailed explanation of key sections of the legacy software program; a third prompt that instructs the LLM to explain procedural code for sections and sub-sections of the legacy software program; a fourth prompt that instructs the LLM to identify sections of the legacy software program that the LLM does not need to describe; a fifth prompt that identifies for the LLM a section of the legacy software program with variable definitions as important; a sixth prompt that instructs the LLM to provide, in the description, inline implementation details and explanations for statements in the legacy software program; a seventh prompt that instructs the LLM to ensure that no logic flow or condition checks with the legacy software program are omitted from the description; an eighth prompt that instructs the LLM to explain IF conditions in the legacy software program and outcomes for the IF conditions in business terms; a ninth prompt that instructs the LLM to generate the description so that the description can be translated into a business flow diagram; a tenth prompt that instructs the LLM that the description should map variable names and section names in the legacy software program to corresponding business meanings; and an eleventh prompt that instructs the LLM to include in the description a summary of the legacy software program. In various implementations, the first prompt can identify for the LLM a target audience for the description.

In various implementations, the artifacts file can comprise a rules data model, the business rules of the legacy software program, and outcomes for the business rules. For example, the artifacts file can comprise a table. Also, the code generation computer system can be configured to generate the configuration file from the artifacts file by: generating metadata from the artifacts file; and generating rule code, in the target programming language from the metadata, in which case the enterprise computer system can be configured to run the rule code in the configuration file at runtime to apply the business rules.

In various implementations, the generated metadata comprises JavaScript Object Notation ("JSON") metadata; the rule code is generated from the JSON metadata; and the enterprise computer system comprises a Java-based rules engine. The rule code can be generated from the JSON metadata by substituting values in the JSON metadata into a defined DRL template.

In various implementations, the method further comprises generating, by the LLM based on third prompting, a test script model for the enterprise computer system, wherein the third prompting directs the LLM to generate the test script model such that the test script model defines one or more test activities for the enterprise computer system; and converting, by the enterprise computer system, the test script model into code artifacts at compile time of the enterprise computer system; and running, by the enterprise computer system, the code artifacts at run time of the enterprise computer system to test the enterprise computer system. The test script model can comprise at least one table that specifies attributes and parameters for a test script for the enterprise computer system. The code artifacts can comprise metadata representations of activities to be performed as part of a test of the enterprise computer system.

In various implementations, the method further comprises: running, in parallel by the enterprise computer system, the legacy software programming and the program code in the target programming language; inputting, to the LLM, outputs from the enterprise computer system from running the legacy software programming and outputs from running the program code in the target programming language; prompting the LLM to generate a comparison of the outputs from the enterprise computer system from running the legacy software programming and outputs from running the program code in the target programming language; and generating, by the LLM, the comparison based on the prompting. In such embodiments, the prompting can comprise a directive to generate a function-by-function comparison of function outputs of from running the legacy software program and function outputs from running the program code in the target programming language. Also, generating the comparison can comprise including a function-by-function comparison in the comparison.

In various implementations, the prompting comprises a first prompt that comprises: a directive to generate the program code in the target programming language directly from the legacy software program; and a number of iterative steps. The iterative steps can include: expanding one function at a time, keeping N lines or less in a function body being expanded and pushing any detail logic for function being expanded to one or more sub-functions; tagging each of the one or more sub-functions to be expanded with a tag lexical unit; and providing a next prompt that should be provided to the LLM to continue iterative migration of the legacy software program to the program code in the target programming language. The prompting can also comprise iterative prompts to the LLM corresponding to the next prompt provided by the LLM.

In various implementations, the prompting further includes: a first additional prompt to the LLM to review the program code in the target programming language and provide one or more adjustments to the program code in the target programming language; a second additional prompt to implement the one or more adjustments; and a third additional prompt to write unit tests for the program code in the target programming language.

In various implementations, wherein the legacy software program is written in Perl and the target programming language comprises Python. In various implementations, the legacy software program is written in Cobol and the target programming language comprises Python or Java.

In various implementations, uploading the file with the source code of the legacy software program to the LLM comprises uploading the file with source code of the legacy software program in multiple segments. In such circumstances, the step of generating the description can comprise: generating separately, by the LLM, a description, in the human language, for each of the multiple segments of the legacy software program; and combining the description for each of the multiple segments. In various implementations, each of the multiple segments corresponds to one or more nodes of a call graph for the legacy software program.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of converting a programming language of a legacy software program of an enterprise that is executed by an enterprise computer system of the enterprise to a software program in a target programming language that is different from the programming language of the legacy software program, the method comprising:
   uploading, from a user device to a large language model ("LLM") running on an AI computer system, a file with source code, written in a first programming language, of the legacy software program;
   prompting, from the user device, the LLM to generate, from the legacy software program, the software program in the target programming language, wherein the prompting comprises:
      first prompting, from the user device, the LLM to generate a description, in a human language, of the source code in the file for the legacy software program:
      generating, based on the first prompting, by the LLM the description, in the human language, of the source code in the file;
      validating, by a subject matter expert for the enterprise, the description in the human language of the source code in the legacy code file;
      after validating the description, second prompting, by the user device, the LLM to generate an output file that captures business rules of the legacy software program based on the description, and wherein the second prompting comprises:
         prompting about an architecture of the enterprise computer system; and
         prompting with domain specific metadata for the enterprise computer system;
   generating, by the LLM, based on the legacy software program and the prompting, the software program code in the target programming language, wherein the program code in the target programming language is based on the output file; and
   executing, by the enterprise computer system, the program code in the target programming language.

2. The method of claim 1, wherein:
   the second prompting further comprises a directive to the LLM to generate the program code in the target programming language; and
   the output file comprises the program code written in the target programming language.

3. The method of claim 1, wherein:
   the enterprise computer system comprises a rules engine;
   the output file comprises an artifacts file that captures business rules of the legacy software program based on the description; and
   executing the program code in a target programming language comprises:
      generating, by a code generation computer system, a configuration file that comprises the business rules of the legacy software program written in the target programming language that is different from the first programming language, wherein the configuration file comprises the program code in the target programming language; and
      executing, by the enterprise computer system, the configuration file at runtime of the enterprise computer system.

4. The method of claim 1, wherein:
the enterprise computer system comprises a rules engine; and
the second prompting further comprises a directive to the LLM to generate a configuration file that comprises the business rules of the legacy software program written in the target programming language that is different from the first programming language, wherein the configuration file comprises the program code in the target programming language; and
executing, by the enterprise computer system, the program code in the target programming language comprises executing, by the enterprise computer system, the configuration file at runtime of the enterprise computer system.

5. The method of claim 1, wherein the first prompting for the LLM to generate the description, in the human language, of the source code in the file for the legacy software program, comprises:
a first prompt that instructs the LLM to include in the description an explanation of a general functionality of the legacy software program;
a second prompt that instructs the LLM to provide a detailed explanation of key sections of the legacy software program;
a third prompt that instructs the LLM to explain procedural code for sections and sub-sections of the legacy software program;
a fourth prompt that instructs the LLM to identify sections of the legacy software program that the LLM does not need to describe;
a fifth prompt that identifies for the LLM a section of the legacy software program with variable definitions as important;
a sixth prompt that instructs the LLM to provide, in the description, inline implementation details and explanations for statements in the legacy software program;
a seventh prompt that instructs the LLM to ensure that no logic flow or condition checks with the legacy software program are omitted from the description;
an eighth prompt that instructs the LLM to explain IF conditions in the legacy software program and outcomes for the IF conditions in business terms;
a ninth prompt that instructs the LLM to generate the description so that the description can be translated into a business flow diagram;
a tenth prompt that instructs the LLM that the description should map variable names and section names in the legacy software program to corresponding business meanings; and
an eleventh prompt that instructs the LLM to include in the description a summary of the legacy software program.

6. The method of claim 5, wherein the first prompt identifies for the LLM a target audience for the description.

7. The method of claim 3, wherein the artifacts file comprises a rules data model, the business rules of the legacy software program, and outcomes for the business rules.

8. The method of claim 7, wherein the artifacts file comprises a table.

9. The method of claim 8, wherein the code generation computer system is configured to generate the configuration file from the artifacts file by:
generating metadata from the artifacts file; and
generating rule code, in the target programming language from the metadata, wherein the enterprise computer system is configured to run the rule code in the configuration file at runtime to apply the business rules.

10. The method of claim 9, wherein:
the generated metadata comprises JavaScript Object Notation ("JSON") metadata;
the rule code is generated from the JSON metadata; and
the enterprise computer system comprises a Java-based rules engine.

11. The method of claim 10, wherein the rule code is generated from the JSON metadata by substituting values in the JSON metadata into a defined DRL template.

12. The method of claim 1, further comprising:
generating, by the LLM based on third prompting, a test script model for the enterprise computer system, wherein the third prompting directs the LLM to generate the test script model such that the test script model defines one or more test activities for the enterprise computer system; and
converting, by the enterprise computer system, the test script model into code artifacts at compile time of the enterprise computer system; and
running, by the enterprise computer system, the code artifacts at run time of the enterprise computer system to test the enterprise computer system.

13. The method of claim 12, wherein the test script model comprises at least one table that specifies attributes and parameters for a test script for the enterprise computer system.

14. The method of claim 12, wherein the code artifacts comprise metadata representations of activities to be performed as part of a test of the enterprise computer system.

15. The method of claim 1, further comprising:
running, in parallel by the enterprise computer system, the legacy software programming and the program code in the target programming language;
inputting, to the LLM, outputs from the enterprise computer system from running the legacy software programming and outputs from running the program code in the target programming language;
prompting the LLM to generate a comparison of the outputs from the enterprise computer system from running the legacy software programming and outputs from running the program code in the target programming language; and
generating, by the LLM, the comparison based on the prompting.

16. The method of claim 15, wherein:
the prompting comprises a directive to generate a function-by-function comparison of function outputs of from running the legacy software program and function outputs from running the program code in the target programming language; and
generating the comparison comprises including a function-by-function comparison in the comparison.

17. The method of claim 1, further comprising:
uploading, from the user device to the LLM, a second file with source code, written in a third programming language, of a second legacy software program;
second prompting, from the user device, the LLM to generate, from the second legacy software program, a second software program in the target programming language; and
generating, by the LLM, based on the second legacy software program and the second prompting, the second software program in the target programming language, wherein the second prompting comprises:
a first prompt that comprises:
a directive to generate second program code in the target programming language directly from the second legacy software program; and a number of iterative steps, wherein the iterative steps include:
expanding one function at a time, keeping N lines or less in a function body being expanded and pushing any detail logic for function being expanded to one or more sub-functions;
tagging each of the one or more sub-functions to be expanded with a tag lexical unit; and
providing a next prompt that should be provided to the LLM to continue iterative migration of the second legacy software program to the second program code in the target programming language; and
iterative prompts to the LLM corresponding to the next prompt provided by the LLM.

18. The method of claim 17, wherein the second prompting further includes:
a first additional prompt to the LLM to review the second program code in the target programming language and provide one or more adjustments to the second program code in the target programming language;
a second additional prompt to implement the one or more adjustments; and
a third additional prompt to write unit tests for the second program code in the target programming language.

19. The method of claim 1, wherein the legacy software program is written in Perl and the target programming language comprises Python.

20. The method of claim 1, wherein the legacy software program is written in Cobol and the target programming language comprises Python or Java.

21. The method of claim 1, wherein:
uploading the file with the source code of the legacy software program to the LLM comprises uploading the file with source code of the legacy software program in multiple segments; and
generating the description comprises:
generating separately, by the LLM, a description, in the human language, for each of the multiple segments of the legacy software program; and
combining the description for each of the multiple segments.

22. The method of claim 21, wherein each of the multiple segments corresponds to one or more nodes of a call graph for the legacy software program.

23. A system of converting a programming language of a legacy software program of an enterprise to a software program in a target programming language that is different from the programming language of the legacy software program, the system comprising:
an enterprise computer system of the enterprise for executing the legacy software program;
a backend computer system that comprises a large language model ("LLM"); and
a user device in communication with the LLM via an electronic data network, wherein the user device is for:
uploading to the LLM a file with source code, written in a first programming language, of the legacy software program; and
prompting the LLM to generate, from the legacy software program, the software program in the target programming language, wherein:
the LLM is for generating, based on the prompting and the legacy software program and the prompting, the software program in the target programming language; and
the enterprise computer system is for executing software program in the target programming language;
the prompting from the user device to the LLM comprises a first set of prompts to the LLM to generate a description, in a human language, of the source code in the file for the legacy software program;
the LLM is for generating, based on the first set of prompts, the description, in the human language, of the source code in the file;
the user device is further for, after validation, by a subject matter expert, the description in the human language of the source code in the legacy code file, providing a second set of prompts to the LLM to generate an output file that captures business rules of the legacy software program based on the description, and wherein the second set of prompts comprises:
prompting about an architecture of the enterprise computer system; and
prompting with domain specific metadata for the enterprise computer system; and
the enterprise computer system is for executing a program code in the target programming language, wherein the program code in the target programming language is based on the output file.

24. The system of claim 23, wherein:
the second set of prompts further comprises a directive to the LLM to generate the program code in the target programming language; and
the output file comprises the program code written in the target programming language.

25. The system of claim 23, wherein:
the enterprise computer system comprises a rules engine:
the output file comprises an artifacts file that captures business rules of the legacy software program based on the description; and
executing the program code in a target programming language comprises:
generating, by a code generation computer system, a configuration file that comprises the business rules of the legacy software program written in the target programming language that is different from the first programming language, wherein the configuration file comprises the program code in the target programming language; and
executing, by the enterprise computer system, the configuration file at runtime of the enterprise computer system.

26. The system of claim 23, wherein the LLM is further prompted, based on a third set of prompts, to generate a test script model for the enterprise computer system, wherein the third set of prompts directs the LLM to generate the test script model such that the test script model defines one or more test activities for the enterprise computer system; and
converting, by the enterprise computer system, the test script model into code artifacts at compile time of the enterprise computer system; and
running, by the enterprise computer system, the code artifacts at run time of the enterprise computer system to test the enterprise computer system.

27. The system of claim 23, wherein:
the user device is further for:
- uploading to the LLM a second file with source code, written in a third programming language, of a second legacy software program; and
- second prompting the LLM to generate, from the second legacy software program, a second software program in the target programming language, the second prompting comprises:
- a first prompt that comprises:
  - a directive to generate second program code in the target programming language directly from the second legacy software program; and
  - a number of iterative steps, wherein the iterative steps include:
    - expand one function at a time, keeping N lines or less in a function body being expanded and pushing any detail logic for function being expanded to one or more sub-functions;
    - tagging each of the one or more sub-functions to be expanded with a tag lexical unit; and
  - providing a next prompt that should be provided to the LLM to continue iterative migration of the legacy software program to the program code in the target programming language; and
- iterative prompts to the LLM corresponding to the next prompt provided by the LLM;

the LLM is for generating, based on the second prompting and the second legacy software program, the second software program in the target programming lanquage; and the enterprise computer system is for executing the second software program in the target programming language.

28. The system of claim 27, wherein the second prompting further includes:
- a first additional prompt to the LLM to review the second program code in the target programming language and provide one or more adjustments to the second program code in the target programming language;
- a second additional prompt to implement the one or more adjustments; and
- a third additional prompt to write unit tests for the second program code in the target programming language.

\* \* \* \* \*